United States Patent
Suzuki et al.

(10) Patent No.: US 12,257,880 B2
(45) Date of Patent: Mar. 25, 2025

(54) REFRIGERATION CYCLE DEVICE

(71) Applicant: DENSO CORPORATION, Kariya (JP)

(72) Inventors: Satoshi Suzuki, Kariya (JP); Satoshi Itoh, Kariya (JP); Kengo Sugimura, Kariya (JP)

(73) Assignee: DENSO CORPORATION, Kariya (JP)

( * ) Notice: Subject to any disclaimer, the term of this patent is extended or adjusted under 35 U.S.C. 154(b) by 465 days.

(21) Appl. No.: 17/718,808

(22) Filed: Apr. 12, 2022

(65) Prior Publication Data

US 2022/0234416 A1 Jul. 28, 2022

Related U.S. Application Data

(63) Continuation of application No. PCT/JP2020/034154, filed on Sep. 9, 2020.

(30) Foreign Application Priority Data

Oct. 15, 2019 (JP) .................. 2019-188678
Aug. 17, 2020 (JP) .................. 2020-137340

(51) Int. Cl.
*B60H 1/00* (2006.01)

(52) U.S. Cl.
CPC ....... *B60H 1/0073* (2019.05); *B60H 1/00278* (2013.01)

(58) Field of Classification Search
CPC ..... B60H 1/0073; B60H 1/00278; F28F 9/00; F28F 3/06; F28D 9/00; F25B 1/00
USPC ........................................... 62/122
See application file for complete search history.

(56) References Cited

U.S. PATENT DOCUMENTS

| | | | |
|---|---|---|---|
| 10,457,117 B2* | 10/2019 | Enomoto | B60H 1/24 |
| 11,408,615 B2* | 8/2022 | Kato | F24D 17/0005 |
| 11,506,404 B2* | 11/2022 | Ito | B60H 3/024 |
| 11,718,156 B2* | 8/2023 | Kobayashi | B60H 1/3205 62/228.3 |
| 11,787,258 B2* | 10/2023 | Makimoto | F25B 6/04 62/238.3 |
| 2010/0326127 A1* | 12/2010 | Oomura | B60H 1/3208 62/498 |

(Continued)

FOREIGN PATENT DOCUMENTS

| | | |
|---|---|---|
| JP | 5929372 B2 | 6/2016 |
| JP | 2019211197 A | 12/2019 |

*Primary Examiner* — Claire E Rojohn, III
(74) *Attorney, Agent, or Firm* — Harness, Dickey & Pierce, P.L.C.

(57) ABSTRACT

A refrigeration cycle device includes a refrigeration cycle, an outdoor heat exchanger, a cooling necessity determination unit, a determination reference setting unit, and a cooling control unit. The cooling necessity determination unit determines whether or not to cool a battery depending on whether or not a physical quantity that correlates with a temperature of the battery is equal to or more than a predetermined reference physical quantity. The determination reference setting unit sets the reference physical quantity for the cooling necessity determination unit according to the outdoor heat exchanger functioning as a heat absorber or radiator. When the outdoor heat exchanger functions as heat absorber, the determination reference setting unit sets a second reference physical quantity smaller than a first reference physical quantity set when the outdoor heat exchanger functions as radiator.

7 Claims, 14 Drawing Sheets

(56) References Cited

U.S. PATENT DOCUMENTS

| | | | |
|---|---|---|---|
| 2012/0255319 A1* | 10/2012 | Itoh | F25B 41/20 |
| | | | 62/226 |
| 2014/0041826 A1* | 2/2014 | Takeuchi | B60L 1/08 |
| | | | 165/10 |
| 2015/0159933 A1* | 6/2015 | Itoh | F24F 3/1405 |
| | | | 62/226 |
| 2017/0182860 A1* | 6/2017 | Miyakoshi | B60H 1/0073 |
| 2017/0326943 A1* | 11/2017 | Ishizeki | B60H 1/00978 |
| 2018/0354342 A1* | 12/2018 | Miyakoshi | B60H 1/3213 |
| 2019/0070933 A1* | 3/2019 | Ishizeki | B60H 1/3216 |
| 2019/0128569 A1* | 5/2019 | Tada | F25B 49/02 |
| 2020/0047583 A1* | 2/2020 | Ishizeki | H01M 10/635 |
| 2020/0122544 A1* | 4/2020 | Ishizeki | B60H 1/143 |
| 2020/0158380 A1* | 5/2020 | Suzuki | F25B 25/005 |
| 2020/0406783 A1* | 12/2020 | Tokozakura | H01M 10/633 |
| 2021/0016628 A1* | 1/2021 | Kozasa | H01M 10/613 |
| 2021/0102716 A1* | 4/2021 | Ito | F24F 3/153 |
| 2022/0097475 A1* | 3/2022 | Huang | B60H 1/00007 |
| 2022/0181722 A1* | 6/2022 | Kim | B60K 11/02 |
| 2022/0234416 A1* | 7/2022 | Suzuki | F25B 5/02 |
| 2022/0250439 A1* | 8/2022 | Moriya | F25B 5/02 |
| 2022/0314742 A1* | 10/2022 | Miyakoshi | B60H 1/00921 |
| 2022/0410652 A1* | 12/2022 | Hayase | B60H 1/00278 |
| 2023/0020602 A1* | 1/2023 | Lee | B60H 1/3213 |
| 2023/0091458 A1* | 3/2023 | Suzuki | B60H 1/3204 |
| | | | 62/132 |
| 2023/0137140 A1* | 5/2023 | Yamashita | B60H 1/00885 |
| | | | 62/244 |
| 2024/0190213 A1* | 6/2024 | Shiratori | H01M 10/651 |

\* cited by examiner

FIG. 8

| BATTERY TEMPERATURE TB | BATTERY INPUT/OUTPUT CHARACTERISTICS | PROGRESS OF DETERIORATION OF BATTERY |
|---|---|---|
| HIGH | OUTPUT LIMITATION | PROGRESS : LARGE |
| TBU ---- | | |
| KTB1 ---- | NORMAL | |
| KTB2 ---- | | |
| TBL ---- | | |
| LOW | INPUT/OUTPUT LIMITATION | PROGRESS : SMALL |

FIG. 9

| AIR-CONDITIONING MODE | STATE OF OUTDOOR HEAT EXCHANGER | REFERENCE COOLING TEMPERATURE KTB |
|---|---|---|
| AIR-COOLING | RADIATOR | FIRST REFERENCE COOLING TEMPERATURE KTB1 |
| SERIAL DEHUMIDIFYING AND HEATING | RADIATOR | FIRST REFERENCE COOLING TEMPERATURE KTB1 |
| | ABSORBER | SECOND REFERENCE COOLING TEMPERATURE KTB2 |
| PARALLEL DEHUMIDIFYING AND HEATING | ABSORBER | SECOND REFERENCE COOLING TEMPERATURE KTB2 |
| AIR-HEATING | ABSORBER | SECOND REFERENCE COOLING TEMPERATURE KTB2 |
| OTHERS | — | FIRST REFERENCE COOLING TEMPERATURE KTB1 |

REFRIGERATION CYCLE DEVICE

CROSS REFERENCE TO RELATED APPLICATION

The present application is a continuation application of International Patent Application No. PCT/JP2020/034154 filed on Sep. 9, 2020, which designated the U.S. and claims the benefit of priority from Japanese Patent Application No. 2019-188678 filed on Oct. 15, 2019 and Japanese Patent Application No. 2020-137340 filed on Aug. 17, 2020. The entire disclosures of all of the above applications are incorporated herein by reference.

TECHNICAL FIELD

The present disclosure relates to a refrigeration cycle device for an air conditioner.

BACKGROUND

A refrigeration cycle device for an air conditioner is known, in which heat of outside air absorbed by an outdoor heat exchanger is used to heat air for heating, serial dehumidification heating, and parallel dehumidification heating.

SUMMARY

According to one aspect of the present disclosure, a refrigeration cycle device includes a refrigeration cycle, an outdoor heat exchanger, a cooling necessity determination unit, a determination reference setting unit, and a cooling control unit. The refrigeration cycle includes a compressor, a heating unit, and a cooler unit. The compressor compresses and discharges refrigerant. The heating unit uses the refrigerant discharged from the compressor as a heat source to heat air blown to a space to be air-conditioned. The cooler unit evaporates the refrigerant to cool a battery. The outdoor heat exchanger exchanges heat between the refrigerant or heat medium in which heat is exchanged with the refrigerant and outside air. The cooling necessity determination unit determines whether or not to cool the battery depending on whether or not a physical quantity having a correlation with the temperature of the battery is equal to or more than a predetermined reference physical quantity. The determination reference setting unit sets the reference physical quantity for the cooling necessity determination unit depending on a case where the outdoor heat exchanger functions as a heat absorber or a radiator. When it is determined that the battery is to be cooled by the cooling necessity determination unit, the cooling control unit controls the cooler unit to execute the cooling of the battery. When the outdoor heat exchanger functions as a heat absorber, the determination reference setting unit sets a second reference physical quantity smaller than a first reference physical quantity set when the outdoor heat exchanger functions as a radiator.

BRIEF DESCRIPTION OF DRAWINGS

The above and other objectives, features, and advantages of the present disclosure will be clarified by the detailed description below with reference to the accompanying drawings:

FIG. 8 is an explanatory diagram showing a relationship of an input/output characteristics and deterioration tendency of a battery with respect to each reference cooling temperature KTB in the first embodiment;

FIG. 9 is an explanatory diagram showing a correspondence relationship between each air conditioning mode and a reference cooling temperature KTB in the first embodiment;

DESCRIPTION OF EMBODIMENTS

Figure 1:
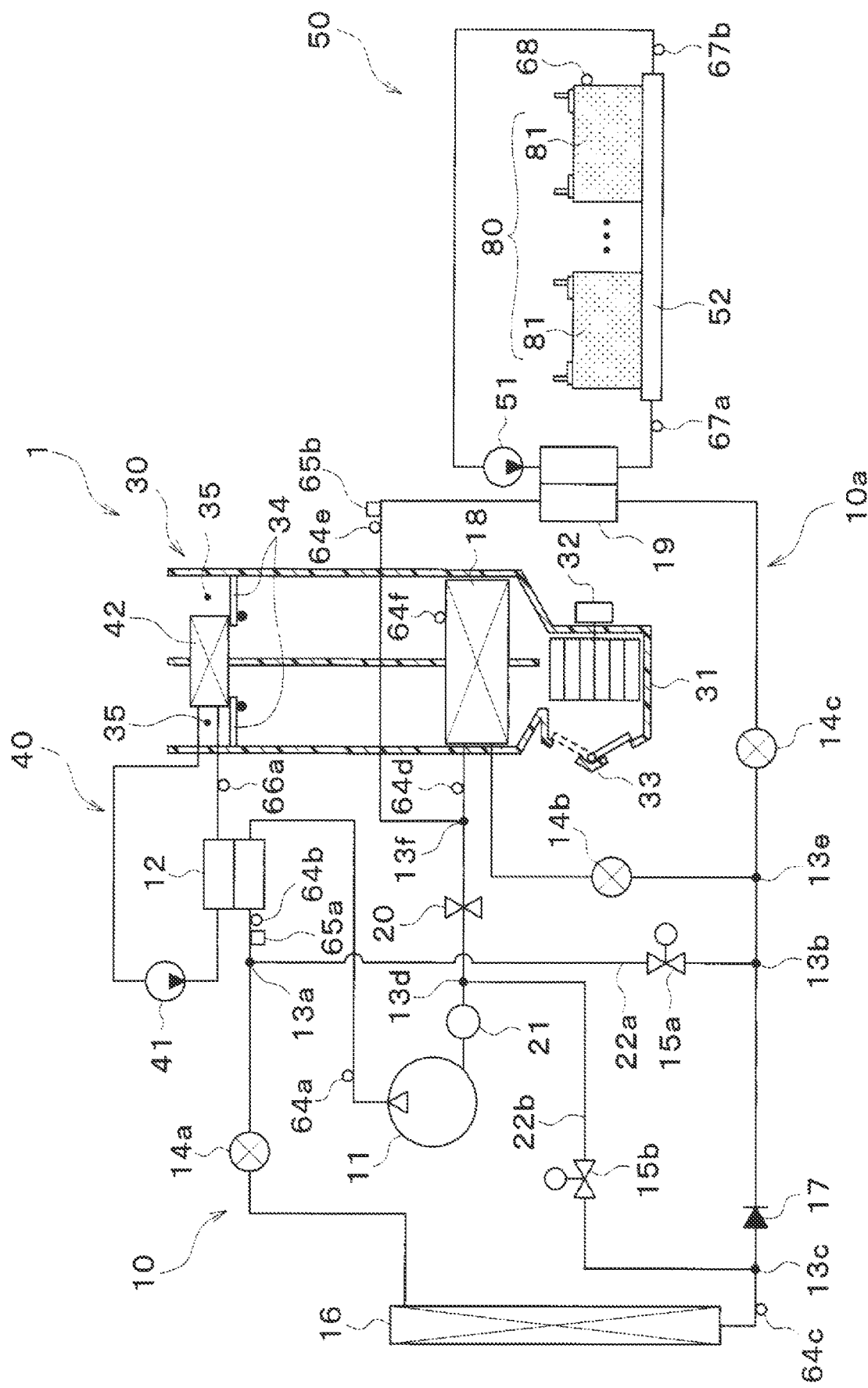
FIG. 1 is an overall configuration diagram of a vehicle air conditioner according to a first embodiment.

To begin with, examples of relevant techniques will be described.

A refrigeration cycle device for an air conditioner is known, in which heat of outside air absorbed by an outdoor heat exchanger is pumped up and used to heat air for heating, serial dehumidification heating, and parallel dehumidification heating. This makes it possible to continuously adjust the temperature of air within a wide range from high-temperature to low-temperature, so as to effectively realize comfortable heating for a cabin in a vehicle in which a heat source for heating tends to be insufficient.

An electric vehicle is equipped with a secondary battery (that is, a battery) that supplies electric power to an electric motor or the like. The output of this type of battery tends to decrease when the temperature becomes low, and the deterioration thereof easily progresses when the temperature becomes high. Therefore, the temperature of the battery needs to be maintained within an appropriate temperature range so as to exhibit the performance of the battery, and it is desired to achieve also comfortable air conditioning for the cabin.

The present disclosure provides a refrigeration cycle device capable of suppressing deterioration of a battery and realizing comfortable heating for a cabin.

According to one aspect of the present disclosure, a refrigeration cycle device is applied to an air conditioner. The refrigeration cycle device includes a refrigeration cycle, an outdoor heat exchanger, a cooling necessity determination unit, a determination reference setting unit, and a cooling control unit.

The refrigeration cycle includes a compressor, a heating unit, and a cooler unit. The compressor compresses and discharges refrigerant. The heating unit uses the refrigerant discharged from the compressor as a heat source to heat air blown to a space to be air-conditioned. The cooler unit evaporates the refrigerant to cool a battery.

The outdoor heat exchanger exchanges heat between the refrigerant or heat medium in which heat is exchanged with the refrigerant and outside air. The cooling necessity determination unit determines whether or not to cool the battery depending on whether or not a physical quantity having a correlation with the temperature of the battery is equal to or more than a predetermined reference physical quantity.

The determination reference setting unit sets the reference physical quantity for the cooling necessity determination unit depending on a case where the outdoor heat exchanger functions as a heat absorber or a radiator. When it is determined that the battery is to be cooled by the cooling necessity determination unit, the cooling control unit controls the cooler unit to execute the cooling of the battery.

Further, when the outdoor heat exchanger functions as a heat absorber, the determination reference setting unit sets a second reference physical quantity smaller than a first reference physical quantity set when the outdoor heat exchanger functions as a radiator.

According to this, in case where the outdoor heat exchanger functions as a heat absorber, the battery is cooled by the cooler unit when the physical quantity having a correlation with the temperature of the battery is equal to or more than the second reference physical quantity. For this reason, the battery is cooled by the cooler unit in a state where the physical quantity that correlates with the temperature of the battery is smaller than that when the outdoor heat exchanger functions as a radiator. Therefore, the temperature of the battery can be kept low and the deterioration of the battery can be suppressed.

When the outdoor heat exchanger functions as a heat absorber, not only the heat absorbed from the outside air in the outdoor heat exchanger but also the heat absorbed by the cooler unit from the battery can be used as a heat source for heating the air in the heating unit. Therefore, when the outdoor heat exchanger functions as a heat absorber, it is possible to improve the efficiency of heating the air by the heating unit and improve the comfort of the target space for the air conditioning.

Hereinafter, embodiments for implementing the present disclosure will be described referring to drawings. In each embodiment, portions corresponding to those described in the preceding embodiment are denoted by the same reference numerals, and overlapping descriptions may be omitted. When only a part of a configuration is described in each embodiment, the other embodiments described above is capable of be applied for the other parts of the configuration. Not only a combination of parts that clearly indicate that the combination is possible in each embodiment, but also a partial combination of embodiments even if the combination is not specified is also possible when there is no problem in the combination.

First Embodiment

A first embodiment of the present disclosure will be described with reference to FIG. 1 to FIG. 10. In the present embodiment, a refrigeration cycle device 10 according to the present disclosure is applied to a vehicle air conditioner 1 mounted on an electric vehicle that obtains a driving force for traveling from an electric motor. The vehicle air conditioner 1 has a function of conditioning air for the cabin, which is a target space for the air-conditioning, and also adjusting the temperature of a battery 80. Therefore, the vehicle air conditioner 1 can also be called an air conditioner with a battery temperature adjusting function.

The battery 80 is a secondary battery that stores electric power supplied to in-vehicle devices such as an electric motor. The battery 80 of this embodiment is a lithium-ion battery. The battery 80 is a so-called an assembled battery formed by stacking a plurality of battery cells 81 and electrically connecting the battery cells 81 in series or in parallel.

This type of battery has limited input/output at low-temperatures, and its output tends to decrease at high-temperatures. Therefore, the temperature of the battery needs to be maintained within an appropriate temperature range (15° C. or higher and 55° C. or lower in the present embodiment) in which the charge/discharge capacity of the battery can be fully utilized.

Further, in this type of battery, the higher the temperature of the battery, the more easily the cells of the battery deteriorate. In other words, the progress of deterioration of the battery can be suppressed by keeping the temperature of the battery at a certain low-temperature.

Therefore, the vehicle air conditioner 1 is configured to cool the battery 80 by a cold thermal energy generated by the refrigeration cycle device 10. Therefore, a cooling object different from air in the refrigeration cycle device 10 of the present embodiment is the battery 80.

As shown in FIG. 1, the vehicle air conditioner 1 includes the refrigeration cycle device 10, an indoor air-conditioning unit 30, a high-temperature heat medium circuit 40, and a low-temperature heat medium circuit 50.

The refrigeration cycle device 10 cools the air blown into the vehicle interior in order to condition air for the vehicle interior, and transfers heat to and from the high-temperature heat medium circulating in the high-temperature heat medium circuit 40, so as to heat the high-temperature heat medium. Further, in order to cool the battery 80, the refrigeration cycle device 10 transfers heat to and from the low-temperature heat medium circulating in the low-temperature heat medium circuit 50 to cool the low-temperature heat medium.

The refrigeration cycle device 10 is configured to switch the refrigerant circuit for various operation modes in order to perform air conditioning in the vehicle interior. The refrigeration cycle device 10 is configured to set, for example, a refrigerant circuit for a cooling mode, a refrigerant circuit for a dehumidifying/heating mode, a refrigerant circuit for a heating mode, and the like. Further, the refrigeration cycle device 10 can switch an operation mode in which the battery 80 is cooled and an operation mode in which the battery 80 is not cooled, in each mode for air-conditioning.

Further, the refrigeration cycle device 10 uses an HFO-based refrigerant (specifically, R1234yf) as a refrigerant, and provides a vapor compression type subcritical refrigeration cycle in which a pressure of a discharged refrigerant discharged from the compressor 11 does not exceed the critical pressure of the refrigerant. Further, a refrigerator oil for lubricating the compressor 11 is mixed in the refrigerant. A part of the refrigerator oil circulates in the cycle together with the refrigerant.

As shown in FIG. 1, a compressor 11, a water refrigerant heat exchanger 12, an air-air-heating expansion valve 14a, an air-cooling expansion valve 14b, a cooler-unit expansion valve 14c, an outdoor heat exchanger 16, an indoor evaporator 18, and a chiller 19 are connected in the refrigeration cycle 10a of the refrigeration cycle device 10.

In the refrigeration cycle device 10, the compressor 11 draws in, compresses, and discharges the refrigerant. The compressor 11 is arranged in a drive device compartment that houses an electric motor and the like in a front of the cabin.

The compressor 11 is an electric compressor that rotationally drives a fixed capacity type compression mechanism having a fixed discharge capacity, by an electric motor. The rotation speed (that is, refrigerant discharge capacity) of the compressor 11 is controlled by a control signal output from the controller 60 described later.

The inlet side of the refrigerant passage of the water refrigerant heat exchanger 12 is connected to the discharge port of the compressor 11. The water refrigerant heat exchanger 12 has a refrigerant passage for circulating the high-pressure refrigerant discharged from the compressor 11 and a water passage for circulating a high-temperature heat medium circulating in the high-temperature heat medium circuit 40. The water refrigerant heat exchanger 12 is a heating heat exchanger to heat the high-temperature heat medium, by performing heat exchange between the high pressure refrigerant flowing through the refrigerant passage and the high-temperature heat medium flowing through the water passage.

An inlet side of a first three-way joint 13a having three inlets and outlets is connected to an outlet of the refrigerant passage of the water refrigerant heat exchanger 12. A joint formed by jointing a plurality of pipes, or a joint formed by providing a plurality of refrigerant passages to a metal block or a resin brock may be utilized as the three-way joint.

Further, the refrigeration cycle device 10 includes a second three-way joint 13b to a sixth three-way joint 13f, as will be described later. The basic configuration of each of the second to sixth three-way joints 13b to 13f is similar to that of the first three-way joint 13a.

An inlet side of the air-heating expansion valve 14a is connected to one outlet of the first three-way joint 13a. One of the inlets of the second three-way joint 13b is connected to the other outlet of the first three-way joint 13a via a bypass passage 22a. A dehumidification on-off valve 15a is arranged in the bypass passage 22a.

The dehumidification on-off valve 15a is an electromagnetic valve that opens or closes the refrigerant passage connecting the other outlet of the first three-way joint 13a and the one inlet of the second three-way joint 13b. Further, the refrigeration cycle device 10 includes an air-heating on-off valve 15b, as described later. The basic configuration of the air-heating on-off valve 15b is the same as that of the dehumidification on-off valve 15a.

The dehumidification on-off valve 15a and the air-heating on-off valve 15b can switch the refrigerant circuit of each of the operation modes by opening or closing the refrigerant passage. Therefore, the dehumidification on-off valve 15a and the air-heating on-off valve 15b are refrigerant circuit switching devices for switching the refrigerant circuit of the cycle. Operations of the dehumidification on-off valve 15a and the air-heating on-off valve 15b are controlled by control voltages output from the controller 60.

The air-heating expansion valve 14a is a heating pressure reducer, which decompresses the high-pressure refrigerant flowing out of the refrigerant passage of the water refrigerant heat exchanger 12, and simultaneously adjusts a flow amount (mass flow rate) of the refrigerant flowing out to a downstream side, in an operation mode for heating at least the cabin. The air-heating expansion valve 14a is an electrical type variable throttle mechanism that includes a valve element configured to vary a throttle level and an electric actuator configured to vary the opening degree of the valve element.

Further, the refrigeration cycle device 10 includes the air-cooling expansion valve 14b and a cooler-unit expansion valve 14c, as described later. The basic configurations of the air-cooling expansion valve 14b and the cooler-unit expansion valve 14c are similar to that of the air-heating expansion valve 14a.

Each of the air-heating expansion valve 14a, the air-cooling expansion valve 14b, and the cooler-unit expansion valve 14c has a fully open function and a fully closed function. The fully open function is equivalent to simply being a refrigerant passage without exerting a flow rate adjusting effect or refrigerant pressure reduction effect, i.e., by fully opening the valve opening degree. The fully closed function is a function of closing the refrigerant passage by fully closing the valve opening. The air-heating expansion valve 14a, the air-cooling expansion valve 14b, and the cooler-unit expansion valve 14c can switch the refrigerant circuit in each operation mode by the fully open function and the fully closed function.

Therefore, the air-heating expansion valve 14a, the air-cooling expansion valve 14b, and the cooler-unit expansion valve 14c of the present embodiment also have a function as a refrigerant circuit switching device. The operations of the air-heating expansion valve 14a, the air-cooling expansion valve 14b, and the cooler-unit expansion valve 14c are controlled by control signals (control pulse) output from the controller 60.

A refrigerant inlet side of the outdoor heat exchanger 16 is connected to an outlet of the air-heating expansion valve 14a. The outdoor heat exchanger 16 is a heat exchanger for exchanging heat between the refrigerant flowing out from the air-heating expansion valve 14a and the outside air blown by a cooling fan (not shown). The outdoor heat exchanger 16 is arranged on the front side within the drive device chamber. Therefore, wind can be applied to the outdoor heat exchanger 16 when the vehicle is traveling.

An inlet of the third three-way joint 13c is connected to the refrigerant outlet of the outdoor heat exchanger 16. One inlet of the fourth three-way joint 13d is connected to one outlet of the third three-way joint 13c via the heating passage 22b. The air-heating on-off valve 15b for opening and closing the refrigerant passage is arranged in the heating passage 22b.

The other inlet of the second three-way joint 13b is connected to the other outlet of the third three-way joint 13c. A check valve 17 is disposed in a refrigerant passage connecting the other outlet of the third three-way joint 13c and the other inlet of the second three-way joint 13b. The check valve 17 allows the refrigerant to flow from the third three-way joint 13c to the second three-way joint 13b, and prohibits the refrigerant from flowing from the second three-way joint 13b to the third three-way joint 13c.

An inlet of the fifth three-way joint 13e is connected to an outlet of the second three-way joint 13b. An inlet of the air-cooling expansion valve 14b is connected to one outlet of the fifth three-way joint 13e. An inlet of the cooler-unit expansion valve 14c is connected to the other outlet of the fifth three-way joint 13e.

The air-cooling expansion valve 14b is a cooling pressure reducer, which decompresses the refrigerant flowing out from the outdoor heat exchanger 16, and simultaneously adjusts the flow amount of the refrigerant flowing out to the downstream side, in an operation mode for cooling at least the cabin.

A refrigerant inlet of the indoor evaporator 18 is connected to an outlet of the air-cooling expansion valve 14b. The indoor evaporator 18 is disposed in the air-conditioning case 31 of the indoor air-conditioning unit 30 described later. The indoor evaporator 18 is a cooling heat exchanger to cool the air by making the low-pressure refrigerant to absorb heat by evaporating the low-pressure refrigerant, by performing heat exchange between the low pressure refrigerant decompressed by the air-cooling expansion valve 14b and the air supplied from the blower 32. One inlet of the sixth three-way joint 13f is connected to a refrigerant outlet of the indoor evaporator 18.

The cooler-unit expansion valve 14c is a cooling pressure reducer, which decompresses the refrigerant flowing out of the outdoor heat exchanger 16, and simultaneously adjusts a flow amount of the refrigerant flowing out to the downstream side, in an operation mode in which at least the battery 80 is cooled.

The inlet side of the refrigerant passage of the chiller 19 is connected to the outlet of the cooler-unit expansion valve 14c. The chiller 19 has a refrigerant passage through which a low-pressure refrigerant whose pressure has been reduced by the cooler-unit expansion valve 14c flows, and a water passage through which a low-temperature heat medium circulating in the low-temperature heat medium circuit 50 flows. The chiller 19 is an evaporator to make the low-pressure refrigerant to evaporate and to absorb heat, by performing heat exchanging between the low-pressure refrigerant flowing through the refrigerant passage and the low-temperature heat medium flowing through the water passage. The other inlet of the sixth three-way joint 13f is connected to an outlet of the refrigerant passage of the chiller 19.

An inlet of the evaporation pressure adjusting valve 20 is connected to an outlet of the sixth three-way joint 13f. The evaporation pressure adjusting valve 20 keeps a refrigerant evaporating pressure in the indoor evaporator 18 above or at a predetermined reference pressure in order to restrict frost formation on the indoor evaporator 18. The evaporation pressure adjusting valve 20 is configured with a mechanical variable orifice mechanism that increases a degree of valve opening as a pressure of the refrigerant on the outlet side of the indoor evaporator 18 increases.

As a result, the evaporation pressure adjusting valve 20 maintains the refrigerant evaporation temperature in the indoor evaporator 18 at or above the frost suppression temperature (1° C. in the present embodiment) capable of suppressing frost formation on the indoor evaporator 18. Further, the evaporation pressure adjusting valve 20 of the present embodiment is arranged on a downstream side of the sixth three-way joint 13f, which is a merging portion, in a flow of refrigerant. Therefore, the evaporation pressure adjusting valve 20 also maintains the refrigerant evaporation temperature in the chiller 19 at the frost formation suppression temperature or higher.

The other inlet of the fourth three-way joint 13d is connected to an outlet of the evaporation pressure adjusting valve 20. An inlet side of the accumulator 21 is connected to an outlet of the fourth three-way joint 13d. The accumulator 21 is a gas-liquid separator that separates gas and liquid of the refrigerant flowing into the accumulator 21 and stores therein liquid-phase refrigerant of the cycle. A gas-phase refrigerant outlet of the accumulator 21 is connected to a suction port of the compressor 11.

As is clear from the above description, the fifth three-way joint 13e of the present embodiment functions as a branch portion that branches the refrigerant flow that has flowed out of the outdoor heat exchanger 16. The sixth three-way joint 13f is a merging portion, which merges a refrigerant flow flowing out of the indoor evaporator 18 and the refrigerant flow flowing out of the chiller 19 so as to be discharged to a suction side of the compressor 11.

The indoor evaporator 18 and the chiller 19 are connected to each other in parallel with the refrigerant flow. Further, the bypass passage 22a guides the refrigerant flowing out of the refrigerant passage of the water refrigerant heat exchanger 12 to the upstream side of the branch portion. The heating passage 22b guides the refrigerant flowing out of the outdoor heat exchanger 16 to the suction port of the compressor 11.

Next, the high-temperature heat medium circuit 40 will be described. The high-temperature heat medium circuit 40 is a heat medium circulation circuit for circulating the high-temperature heat medium. As the high-temperature heat medium, ethylene glycol, dimethylpolysiloxane, a solution including a nano-fluid or the like, an antifreeze liquid or the like can be adopted. In the high-temperature heat medium circuit 40, the water passage of the water refrigerant heat exchanger 12, a high-temperature heat medium pump 41, and a heater core 42, etc. are arranged.

The high-temperature heat medium pump 41 is a water pump that pumps the high-temperature heat medium to the inlet side of the water passage of the water refrigerant heat exchanger 12. The high-temperature heat medium pump 41 is an electric pump in which a rotation speed (that is, a pumping capacity) is controlled by a control voltage output from the controller 60.

Further, a heat medium inlet side of the heater core 42 is connected to an outlet of the water passage of the water refrigerant heat exchanger 12. The heater core 42 is a heat exchanger that exchanges heat between the high-temperature heat medium heated by the water refrigerant heat exchanger 12 and the air that has passed through the indoor evaporator 18 to heat the air. The heater core 42 is arranged in the air-conditioning case 31 of the indoor air-conditioning unit 30. A suction port of the high-temperature heat medium pump 41 is connected to a heat medium outlet of the heater core 42.

Therefore, in the high-temperature heat medium circuit 40, it is possible to adjust a heat dissipation amount from the high-temperature heat medium to the air at the heater core 42 (that is, the heating amount of the air in the heater core 42) by adjusting a flow amount of the high-temperature heat medium flowing into the heater core 42 by the high-temperature heat medium pump 41.

That is, in the present embodiment, each component of the water refrigerant heat exchanger 12 and the high-temperature heat medium circuit 40 constitutes a heating unit for heating the air using the refrigerant discharged from the compressor 11 as a heat source.

Next, the low-temperature heat medium circuit 50 will be described. The low-temperature heat medium circuit 50 is a heat medium circulation circuit for circulating the low-temperature heat medium. As the low-temperature heat medium, a fluid similar to the high-temperature heat medium can be adopted. In the low-temperature heat medium circuit 50, a water passage of the chiller 19, a low-temperature heat medium pump 51, a cooling heat exchange unit 52, and the like are arranged.

The low-temperature heat medium pump 51 is a water pump that pumps the low-temperature heat medium to the inlet side of the water passage of the chiller 19. The basic configuration of the low-temperature heat medium pump 51 is the same as that of the high-temperature heat medium pump 41.

The inlet side of the cooling heat exchange unit 52 is connected to the outlet of the water passage of the chiller 19. The cooling heat exchange unit 52 has plural metal heat medium flow paths arranged so as to come into contact with the battery cells 81 of the battery 80. The cooling heat exchange unit 52 is a heat exchange unit that cools the battery 80 by exchanging heat between the low-temperature heat medium flowing through the heat medium flow path and the battery cell 81. The suction port side of the low-temperature heat medium pump 51 is connected to the outlet of the cooling heat exchange unit 52.

Such a cooling heat exchange unit 52 may be formed by disposing a heat medium passage between the battery cells 81 arranged in a stacking manner. The cooling heat exchange unit 52 may be formed integrally with the battery 80. For example, the cooling heat exchange unit 52 may be integrally formed with the battery 80 by arranging a heat medium passage to a dedicated case for housing the battery cells 81 arranged in a stacking manner.

Therefore, in the low-temperature heat medium circuit 50, the low-temperature heat medium pump 51 can adjust an amount of heat absorbed from the battery 80 to the low-temperature heat medium in the cooling heat exchange unit 52 by adjusting a flow amount of the low-temperature heat medium flowing into the cooling heat exchange unit 52. That is, in the present embodiment, the components of the chiller 19 and the low-temperature heat medium circuit 50 configure a cooler unit to cool the battery 80, by evaporating the refrigerant flowing out from the cooler-unit expansion valve 14c.

Next, the indoor air-conditioning unit 30 will be described. The indoor air-conditioning unit 30 supplies air which has been conditioned in temperature by the refrigeration cycle device 10 to the cabin. The indoor air-conditioning unit 30 is disposed inside an instrument panel at the foremost part in the cabin.

As shown in FIG. 1, the indoor air-conditioning unit 30 has a blower 32, the indoor evaporator 18, and the heater core 42 housed in an air passage formed within the air-conditioning case 31 forming an outer shell of the indoor air-conditioning unit 30.

The air-conditioning case 31 forms an air passage for the air blown to the cabin. The air-conditioning case 31 is formed of a resin (for example, polypropylene) having a certain degree of elasticity and also excellent in strength.

An inside-outside air switch device 33 is disposed on the most upstream side of the air-conditioning case 31 in a flow of air. The inside-outside air switch device 33 switches and introduces an inside air (air within the cabin) and an outside air (air outside the cabin) into the air-conditioning case 31.

The inside-outside air switch device 33 continuously adjusts an opening area of an inside air introduction port through which the inside air is introduced into the air-conditioning case 31 and an opening area of an outside air introduction port through which the outside air is introduced into the air-conditioning case 31 by using an inside/outside air switching door to change an introduction ratio of a volume of the inside air to a volume of the outside air. The inside/outside air switching door is driven by an electric actuator for the inside/outside air switching door. Operation of the electric actuator is controlled by a control signal output from the controller 60.

The blower 32 is disposed downstream of the inside-outside air switch device 33 in flow of the air. The blower 32 blows air sucked through the inside-outside air switch device 33 toward the cabin. The blower 32 is an electric blower in which a centrifugal multi-blade fan is driven by an electric motor. A rotation speed (i.e., blowing capacity) of the blower 32 is controlled by a control voltage output from the controller 60.

The indoor evaporator 18 and the heater core 42 are disposed in this order downstream of the blower 32 in flow of the air. That is, the indoor evaporator 18 is disposed upstream of the heater core 42 in flow of air.

In the air-conditioning case 31, a cold air bypass passage 35 is provided in which the air passing through the indoor evaporator 18 flows by bypassing the heater core 42. An air mix door 34 is disposed in the air-conditioning case 31 at the downstream side of the indoor evaporator 18 and at upstream side of the heater core 42 in flow of air.

The air mix door 34 is an air volume ratio adjusting unit which controls an air volume ratio of a volume of the air passing through the heater core 42 to a volume of the air passing through the cold air bypass passage 35 after passing through the indoor evaporator 18. The air mix door 34 is driven by an electric actuator for the air mix door. Operation of the electric actuator is controlled by a control signal output from the controller 60.

A mixing space is arranged downstream side of the heater core 42 and the cold air bypass passage 35 in flow of air in the air-conditioning case 31. The mixing space is for mixing the air heated by the heater core 42 and the air that has not heated by passing through the cold air bypass passage 35.

Opening holes for discharging the air (i.e., conditioned air) mixed in the mixing space to the cabin, which is a space to be air-conditioned, are defined in the air-conditioning case 31 at the downstream portion in flow of air.

The opening holes include a face opening hole, a foot opening hole, and a defroster opening hole (which are not shown). The face opening hole is an opening hole for blowing the air toward an upper body of an occupant in the cabin. The foot opening hole is an opening hole for blowing the air toward the foot of the occupant. The defroster opening hole is an opening hole for blowing the air toward the inner side surface of the front windshield.

The face opening hole, the foot opening hole, and the defroster opening hole are respectively connected to a face outlet port, a foot outlet port, and a defroster outlet port (not shown) provided in the cabin through ducts defining air passages.

Therefore, the air mix door 34 adjusts an air volume ratio between an air volume passing through the heater core 42 and an air volume passing through the cold air bypass passage 35, thereby adjusting the temperature of the air mixed in the mixing space. As a result, a temperature of the air (conditioned air) to be discharged into the cabin from each outlet port is adjusted.

Further, a face door, a foot door, and a defroster door (which are shown) are arranged on the upstream sides of the face opening hole, the foot opening hole, and the defroster opening hole in flow of air. The face door adjusts an opening area of the face opening hole. The foot door adjusts the opening area of the foot opening hole. The defroster door adjusts an opening area of the defroster opening hole.

The face door, the foot door, and the defroster door form an outlet mode switching door for switching the outlet modes. The doors are connected to an electric actuator for driving the doors via a link mechanism or the like, and are rotated. Operation of this electric actuator is also controlled in accordance with a control signal output from the controller 60.

Specific examples of the outlet modes that can be switched by the switching device include a face mode, a bi-level mode, a foot mode, and the like.

When the face mode is set, the face outlet port is fully opened and air is blown from the face outlet port toward the upper body of the occupant in the cabin. When the bi-level mode is set, both the face outlet port and the foot outlet port are opened to blow out air toward the upper body and the foot of the occupant in the cabin. When the foot mode is set, the foot outlet port is fully opened, and simultaneously the defroster outlet port is opened by a small opening degree, so that the air is blown mainly through the foot outlet port.

Further, the occupant can manually switch the outlet mode switch provided on the operation panel 70 to set the defroster mode. When the defroster mode is set, the defroster outlet port is fully opened so that air is blown toward an inner face of the front windshield through the defroster outlet port.

Next, an outline of an electric control unit of the present embodiment will be described. The controller 60 includes a known microcomputer having CPU, ROM, RAM and the like, and peripheral circuits. Then, the controller 60 performs various calculations and processes based on the air conditioning control program stored in the ROM, and controls the operation of the various devices to be controlled.

The controller 60 has an output end connected to the various control target devices such as a compressor 11, an air-heating expansion valve 14a, an air-cooling expansion valve 14b, a cooler-unit expansion valve 14c, a dehumidification on-off valve 15a, a air-heating on-off valve 15b, a blower 32, a high-temperature heat medium pump 41, and a low-temperature heat medium pump 51.

Figure 2:
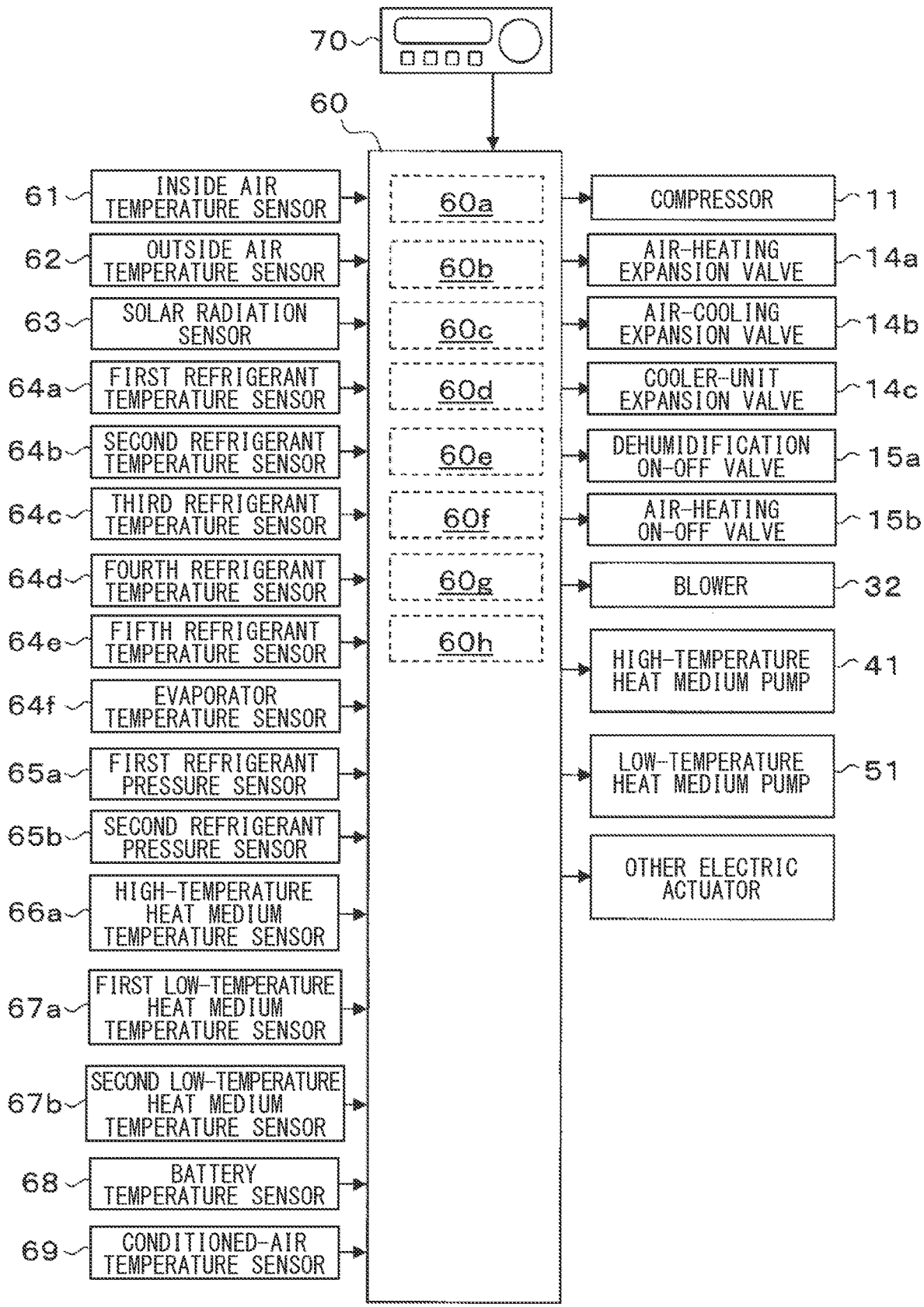
FIG. 2 is a block diagram showing an electric control unit of the vehicle air conditioner according to the first embodiment.

Further, as shown in the block diagram of FIG. 2, various sensors are connected to the input side of the controller 60. Detection signals of the sensors are input into the controller 60 from the sensors such as an inside air temperature sensor 61, an outside air temperature sensor 62, a solar radiation sensor 63, a first refrigerant temperature sensor 64a to a fifth refrigerant temperature sensor 64e, an evaporator temperature sensor 64f, a first refrigerant pressure sensor 65a, and a second refrigerant pressure sensor 65b. Further, the sensors include a high-temperature heat medium temperature sensor 66a, a first low-temperature heat medium temperature sensor 67a, a second low-temperature heat medium temperature sensor 67b, a battery temperature sensor 68, and a conditioned air temperature sensor 69.

The inside air temperature sensor 61 is an inside air temperature detector that detects a cabin temperature (an inside air temperature) Tr. The outside air temperature sensor 62 is an outside air temperature detector that detects a cabin exterior temperature (an outside air temperature) Tam. The solar radiation sensor 63 is a solar radiation amount detector that detects a solar radiation amount Ts radiated into the cabin.

The first refrigerant temperature sensor 64a is a discharged refrigerant temperature detector that detects a temperature T1 of the refrigerant discharged from the compressor 11. The second refrigerant temperature sensor 64b is a second refrigerant temperature detector that detects a temperature T2 of the refrigerant that has flowed out of the refrigerant passage of the water refrigerant heat exchanger 12. The third refrigerant temperature sensor 64c is a third refrigerant temperature detector that detects a temperature T3 of the refrigerant that has flowed out of the outdoor heat exchanger 16.

The fourth refrigerant temperature sensor 64d is a fourth refrigerant temperature detector that detects a temperature T4 of the refrigerant that has flowed out of the indoor evaporator 18. The fifth refrigerant temperature sensor 64e is a fifth refrigerant temperature detector that detects a temperature T5 of the refrigerant flowing out from the refrigerant passage of the chiller 19.

The evaporator temperature sensor 64f is an evaporator temperature detector that detects a refrigerant evaporation temperature (evaporator temperature) Tefin in the indoor evaporator 18. The evaporator temperature sensor 64f of the present embodiment specifically detects a heat exchange fin temperature of the indoor evaporator 18.

The first refrigerant pressure sensor 65a is a first refrigerant pressure detector that detects a pressure P1 of the refrigerant flowing out of the refrigerant passage of the water refrigerant heat exchanger 12. The second refrigerant pressure sensor 65b is a second refrigerant pressure detector that detects a pressure P2 of the refrigerant flowing out from the refrigerant passage of the chiller 19.

The high-temperature heat medium temperature sensor 66a is a high-temperature heat medium temperature detector that detects the high-temperature heat medium temperature TWH, which is a temperature of the high-temperature heat medium flowing out from the water passage of the water refrigerant heat exchanger 12.

The first low-temperature heat medium temperature sensor 67a is a first low-temperature heat medium temperature detector that detects a first low-temperature heat medium temperature TWL1 which is a temperature of the low-temperature heat medium flowing out from the water passage of the chiller 19. The second low-temperature heat medium temperature sensor 67b is a second low-temperature heat medium temperature detector that detects a second low-temperature heat medium temperature TWL2 that is a temperature of the low-temperature heat medium flowing out from the cooling heat exchange unit 52.

The battery temperature sensor 68 is a battery temperature detector that detects a battery temperature TB (that is, the temperature of the battery 80). The battery temperature sensor 68 of the present embodiment has plural temperature sensors and detects temperatures at plural locations of the battery 80. Therefore, the controller 60 can also detect a temperature difference between the locations of the battery 80. Further, as the battery temperature TB, the average value of the detection values of the temperature sensors is adopted.

The conditioned air temperature sensor 69 is a conditioned-air temperature detector that detects a blowing air temperature TAV sent from the mixing space into the cabin.

Further, as shown in FIG. 2, an operation panel 70 arranged near the instrument panel in the front part of the cabin is connected to the input side of the controller 60. Therefore, operation signals from various operation switches provided on the operation panel 70 are input to the controller 60.

Various operation switches provided on the operation panel 70 include, specifically, an auto switch, an air conditioner switch, an air volume setting switch, a temperature setting switch, an outlet mode changeover switch, and the like. The auto switch is operated when automatic control operation of the vehicle air conditioner is set or cancelled. The air conditioner switch is operated to require cooling air in the indoor evaporator 18. The air volume setting switch is operated when manually setting the air volume of the blower 32. The temperature setting switch is operated when setting a target temperature Tset for the cabin. The outlet mode changeover switch is operated when the outlet mode is manually set.

The controller 60 of the present embodiment is integrally configured with a control unit that controls various control target devices connected to an output side thereof. In the controller 60, configurations (hardware and software) to control operations of a control object device configure a control unit.

For example, the controller 60 has a compressor controller 60a to control the refrigerant discharge capacity of the compressor 11 (specifically, the rotation speed of the compressor 11). Further, the structure for controlling the operation of the air-heating expansion valve 14a, the air-cooling expansion valve 14b, and the cooler-unit expansion valve 14c constitutes the expansion valve controller 60b. The structure that controls the operation of the dehumidification on-off valve 15a and the air-heating on-off valve 15b constitutes the refrigerant circuit switching controller 60c.

Further, a configuration for controlling a capability of the high-temperature heat medium pump 41 pumping the high-temperature heat medium constitutes the high-temperature heat medium pump controller 60d. A configuration for controlling a capability of the low-temperature heat medium pump 51 pumping the low-temperature heat medium constitutes the low-temperature heat medium pump controller 60e.

The controller 60 has a cooling necessity determination unit 60f for determining the necessity of cooling the battery 80 when determining the operation mode. The controller 60 has a determination reference setting unit 60g for setting the reference cooling temperature KTB used by the cooling necessity determination unit 60f according to the air conditioning mode of the operation mode.

Further, the controller 60 has a cooling control unit 60h for executing the cooling of the battery 80 using the refrigeration cycle device 10, when the cooling necessity determination unit 60f determines that the battery 80 needs to be cooled.

Operations according to the present embodiment will be described. The vehicle air conditioner 1 of the present embodiment has a function of adjusting the temperature of the battery 80 in addition to the function of air-conditioning the interior of the vehicle.

Therefore, the operation mode of the refrigeration cycle device 10 is a combination of an air conditioning mode relating to air conditioning in the vehicle interior and a cooling mode relating to the temperature adjustment of the battery 80. Specifically, in the refrigeration cycle device 10 according to the present embodiment, the refrigerant circuit can be switched to operate in the following eleven types of operation modes.

(1) Air-cooling mode: an operation mode in which the cabin is cooled by cooling the blown air without cooling the battery 80.

(2) Serial dehumidifying heating mode: an operation mode in which the cabin is dehumidified and heated by reheating the air cooled and dehumidified without cooling the battery 80.

(3) Parallel dehumidifying heating mode: an operation mode in which the cabin is dehumidified and heated by reheating the air cooled and dehumidified with a heating capacity greater than the serial dehumidifying heating mode, without cooling the battery 80.

(4) Heating mode: an operation mode in which the cabin is heated by heating the blown air without cooling the battery 80.

(5) Air-cooling cooler-unit mode: an operation mode in which the cabin is cooled by cooling the blown air, and simultaneously cooling the battery 80.

(6) Serial dehumidifying, heating, and cooler-unit mode: an operation mode in which the cabin is dehumidified and heated by reheating the air cooled and dehumidified, and simultaneously cooling the battery 80.

(7) Parallel dehumidifying, heating and cooler-unit mode: an operation mode in which the cabin is dehumidified and heated by reheating the air cooled and dehumidified with a heating capacity greater than the serial dehumidifying, heating and cooler-unit mode, and simultaneously cooling the battery 80.

(8) Heating cooler-unit mode: an operation mode in which the cabin is heated by heating the blown air, and simultaneously cooling the battery 80.

(9) Heating series cooler-unit mode: an operation mode in which the cabin is heated by heating the blown air with a heating capacity greater than the heating cooler-unit mode, and simultaneously cooling the battery 80.

(10) Heating parallel cooler-unit mode: an operation mode in which the cabin is heated by heating the blown air with a heating capacity greater than the heating series cooler-unit mode, and simultaneously cooling the battery 80.

(11) Cooler-unit mode: an operation mode in which the battery 80 is cooled without conditioning air for the cabin.

Switch in the operation modes is performed by executing an air-conditioning control program. The air-conditioning control program is executed when the auto switch of the operation panel 70 is turned on by an operation of an occupant to set the automatic control for the cabin. The air-conditioning control program will be described with reference to FIG. 3 to FIG. 10. Further, each control step shown in the flowchart of FIG. 3 and the like is a functional unit of the controller 60.

Figure 3:
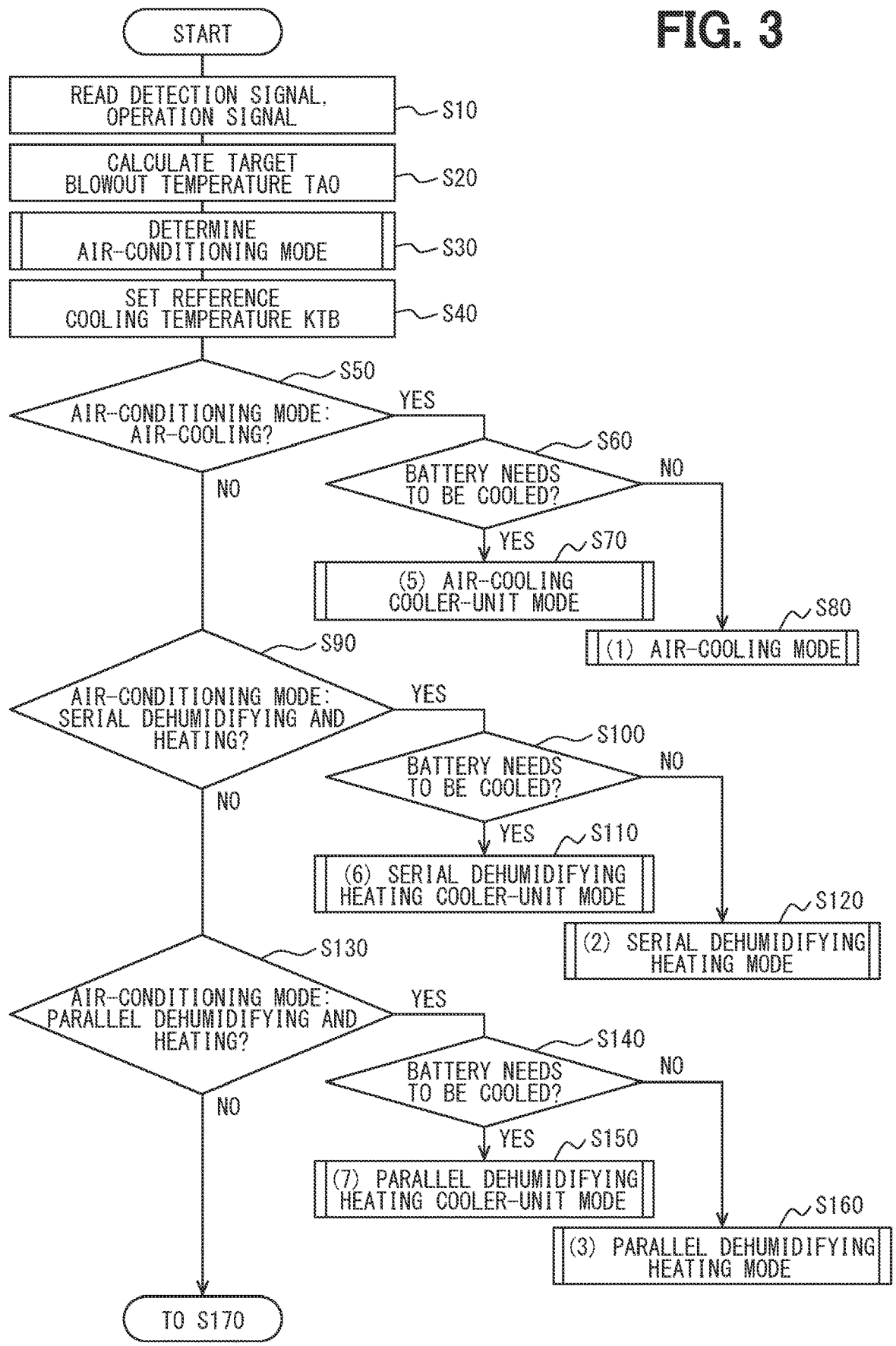
FIG. 3 is a flowchart showing a part of control process of an air conditioning control program of the first embodiment.

First, in step S10 of FIG. 3, the detecting signals of the sensors and the operation signals of the operation panel 70 are read. In the following step S20, a target blowout temperature TAO, which is a target temperature of the air blown into the cabin, is determined based on the detection signals and the operation signals inputted in step S10. Therefore, step S20 is a target outlet temperature determination unit.

Specifically, the target blowout temperature TAO is calculated by the following formula F1.

$$TAO = Kset \times Tset - Kr \times Tr - Kam \times Tam - Ks \times Ts + C \quad (F1)$$

Tset is a cabin set temperature set for the cabin by the temperature setting switch. Tr is a cabin temperature detected by the inside air sensor. Tam is a cabin exterior temperature detected by the outside air sensor. Ts is a solar radiation amount detected by the solar radiation sensor. Kset, Kr, Kam, and Ks are control gains, and C is a constant for correction.

Next, in step S30, the air conditioning mode of the refrigeration cycle device 10 is determined according to the various signals read in step S10 and the target blowout temperature TAO determined in step S20. The air conditioning mode of the refrigeration cycle device 10 is classified into five types such as cooling, serial dehumidifying heating, parallel dehumidifying heating, heating, and other modes.

When the air conditioning mode is cooling, at least the cabin is cooled by cooling air blown into the vehicle interior by the indoor evaporator 18. In the refrigeration cycle device 10 in this case, the refrigerant flows at least in order of the compressor 11, the water refrigerant heat exchanger 12, (the air-heating expansion valve 14a), the outdoor heat exchanger 16, the check valve 17, the air-cooling expansion valve 14b, the indoor evaporator 18, the evaporation pressure adjusting valve 20, the accumulator 21, and then back to the compressor 11.

That is, when the air conditioning mode is cooling, a refrigerant circuit is configured in which the water refrigerant heat exchanger 12 and the outdoor heat exchanger 16 function as radiator, and the indoor evaporator 18 functions as heat absorber.

When the air conditioning mode is serial dehumidifying heating, at least the air cooled and dehumidified by the indoor evaporator 18 is reheated by the water refrigerant heat exchanger 12 and the high-temperature heat medium circuit 40 and supplied to the vehicle interior for dehumidifying and heating.

In the refrigeration cycle device 10 in this case, the refrigerant flows at least in order of the compressor 11, the water refrigerant heat exchanger 12, the air-heating expansion valve 14a, the outdoor heat exchanger 16, the check valve 17, the air-cooling expansion valve 14b, the indoor evaporator 18, the evaporation pressure adjusting valve 20, the accumulator 21, and the compressor 11.

That is, when the air conditioning mode is serial dehumidifying heating, a refrigerant circuit is configured in which the water refrigerant heat exchanger 12 functions as a radiator and the indoor evaporator 18 functions as a heat absorber. The outdoor heat exchanger 16 in this case functions as a radiator or a heat absorber, depending on the relationship between the saturation temperature of the refrigerant in the outdoor heat exchanger 16 and the outside air temperature Tam.

Then, when the air conditioning mode is parallel dehumidifying heating, at least the air cooled and dehumidified by the indoor evaporator 18 is reheated by the high-temperature heat medium circuit 40 with a higher heating capacity than in the case of serial dehumidifying heating, and supplied to the cabin so as to dehumidify and heat the cabin.

In the refrigeration cycle device 10 in this case, at least two refrigerant circulation circuits are configured. First, the refrigerant in this case flows and circulates in order of the compressor 11, the water refrigerant heat exchanger 12, the air-heating expansion valve 14a, the outdoor heat exchanger 16, the heating passage 22b, the accumulator 21, and the compressor 11. At the same time, the refrigerant flows and circulates in order of the compressor 11, the water refrigerant heat exchanger 12, the bypass passage 22a, the air-cooling expansion valve 14b, the indoor evaporator 18, the evaporation pressure adjusting valve 20, the accumulator 21, and the compressor 11.

That is, when the air conditioning mode is parallel dehumidifying heating, the refrigerant circuit is configured such that the water refrigerant heat exchanger 12 functions as a radiator, and the outdoor heat exchanger 16 and the indoor evaporator 18 connected in parallel with respect to the flow of the refrigerant function as heat absorber.

When the air conditioning mode is heating, at least the air blown into the vehicle interior is heated by the high-temperature heat medium circuit 40 to heat the vehicle interior.

In the refrigeration cycle device 10 in this case, at least the refrigerant flows in order of the compressor 11, the water refrigerant heat exchanger 12, the air-heating expansion valve 14a, the outdoor heat exchanger 16, the heating passage 22b, the accumulator 21, and the compressor 11.

That is, when the air conditioning mode is heating, a refrigerant circuit is configured in which the water refrigerant heat exchanger 12 functions as a radiator and the outdoor heat exchanger 16 functions as a heat absorber.

When the air conditioning mode is the other, the temperature adjustment using the refrigeration cycle device 10 for the blown air is unnecessary. Therefore, when the air conditioning mode is the other, the air conditioning is not performed for the vehicle interior or the blown air is supplied to the vehicle interior without performing the temperature adjustment using the refrigeration cycle device 10.

Figure 5:
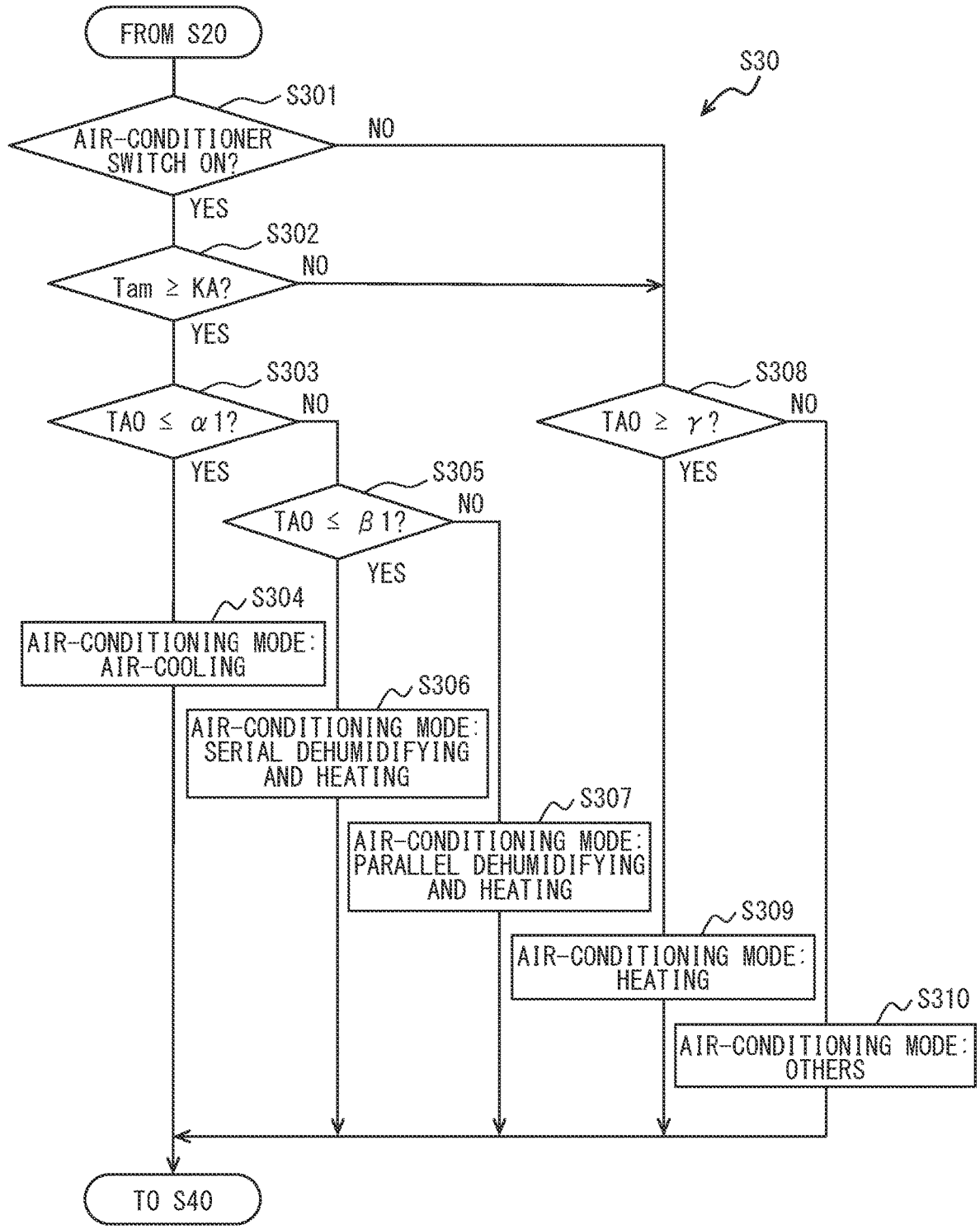
FIG. 5 is a flowchart showing a control process for determining an air conditioning mode in the air conditioning control program of the first embodiment.

In step S30, one air conditioning mode is determined as the current operation mode from the above-mentioned five types of air conditioning modes by executing the control process shown in FIG. 5.

Next, in step S301, it is determined whether or not the air conditioner switch is ON. When the air conditioner switch is turned on, the occupant has requested cooling or dehumidifying of the cabin. In other words, turning on the air conditioner switch means that the indoor evaporator 18 is required to cool the blown air.

When it is determined in step S301 that the air conditioner switch is turned on, the process proceeds to step S302. When it is determined in step S301 that the air conditioner switch is not turned on, the process proceeds to step S308.

In step S302, it is determined whether the outside air temperature Tam is equal to or higher than a predetermined reference outside air temperature KA (0° C. in this embodiment). The reference outside air temperature KA is set so that cooling the blown air by the indoor evaporator 18 is effective for cooling or dehumidifying the target air-conditioned space.

More specifically, in the present embodiment, a refrigerant evaporation temperature in the indoor evaporator 18 is kept equal to or higher than a frost formation suppression temperature (1° C. in the present embodiment) by the evaporation pressure adjusting valve 20, in order to suppress frost formation on the indoor evaporator 18. Therefore, the indoor evaporator 18 cannot cool the blown air to a temperature lower than the frost formation suppression temperature.

That is, when the temperature of the blown air flowing into the indoor evaporator 18 is lower than the temperature of the frost formation suppression temperature, it is not effective to cool the blown air by the indoor evaporator 18. Therefore, the reference outside air temperature KA is set to a value lower than the frost formation suppression temperature. When the outside air temperature Tam is lower than the reference outside air temperature KA, the indoor evaporator 18 does not cool the blown air.

When it is determined in step S302 that the outside air temperature Tam is equal to or higher than the reference outside air temperature KA, the process proceeds to step S303. When it is determined in step S302 that the outside air temperature Tam is not equal to or higher than the reference outside air temperature KA, the process proceeds to step S308.

In step S303, it is determined whether the target blowout temperature TAO is equal to or lower than an air-cooling reference temperature $\alpha 1$. The air-cooling reference temperature al is determined by referring to a control map stored in advance in the controller 60 based on the outside air temperature Tam. In the present embodiment, as shown in FIG. 6, the air-cooling reference temperature α1 is determined to be lower as the outside air temperature Tam decreases.

When it is determined in step S303 that the target blowout temperature TAO is equal to or lower than the air-cooling reference temperature α1, the process proceeds to step S304, and the air conditioning mode is determined to be cooling as the operation mode of the refrigeration cycle device 10. After the air conditioning mode is determined to be cooling, the process proceeds to step S40 in FIG. 3. When it is determined in step S303 that the target blowout temperature TAO is not equal to or lower than the air-cooling reference temperature al, the process proceeds to step S305.

In step S305, it is determined whether the target blowout temperature TAO is equal to or lower than a dehumidifying reference temperature β1. The dehumidifying reference temperature β1 is determined by referring to a control map stored in advance in the controller 60 based on the outside air temperature Tam.

Figure 6:
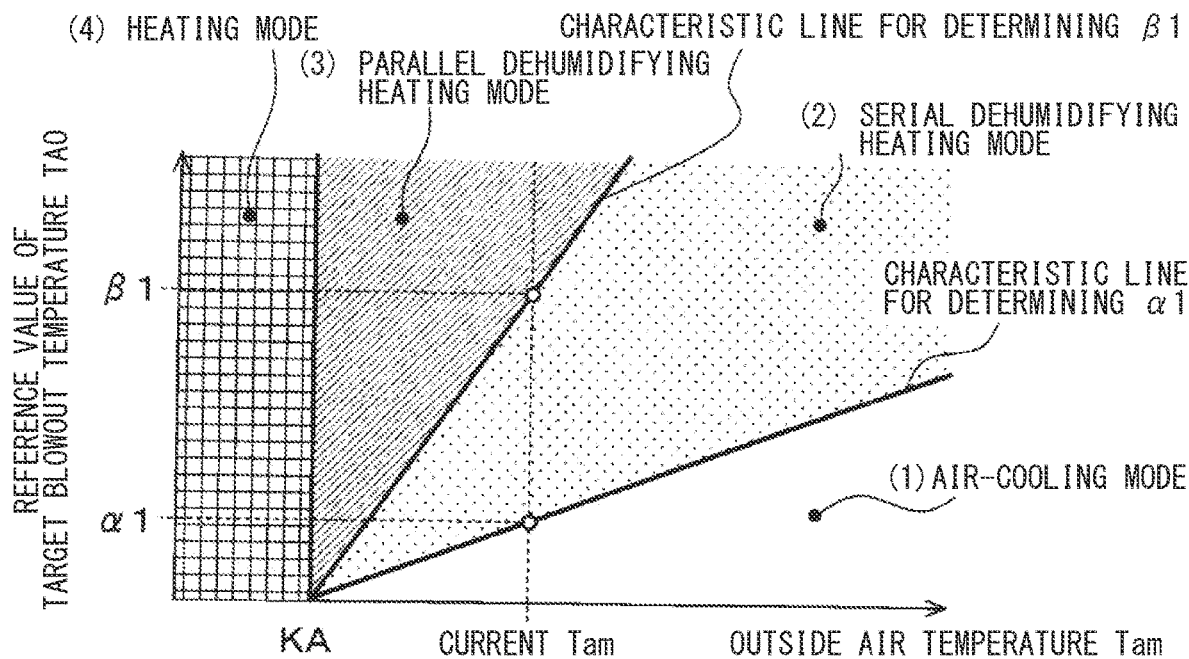
FIG. 6 is a control characteristic diagram for determining an air conditioning mode in the air conditioning control program of the first embodiment.

In the present embodiment, as shown in FIG. 6, the dehumidifying reference temperature β1 is determined to be lower as the outside air temperature Tam decreases, similar to the air-cooling reference temperature α1. Further, the dehumidifying reference temperature β1 is determined to be higher than the air-cooling reference temperature α1.

When it is determined in step S305 that the target blowout temperature TAO is equal to or lower than the dehumidifying reference temperature β1, the process proceeds to step S306, and the air conditioning mode in the refrigeration cycle device 10 is determined to be serial dehumidifying heating. After the air conditioning mode is determined to be serial dehumidifying heating, the process proceeds to step S40 in FIG. 3.

When it is determined in step S305 that the target blowout temperature TAO is not equal to or lower than the dehumidifying reference temperature β1, the process proceeds to step S307, and the air conditioning mode in the refrigeration cycle device 10 is determined to be parallel dehumidifying heating. After determining the air conditioning mode to parallel dehumidifying heating, the process proceeds to step S40 in FIG. 3.

Subsequently, a case where the process proceeds from step S301 or step S302 to step S308 will be described. The process proceeds from step S301 or step S302 to step S308, since it is determined that cooling the blown air by the indoor evaporator 18 is not effective.

Figure 7:
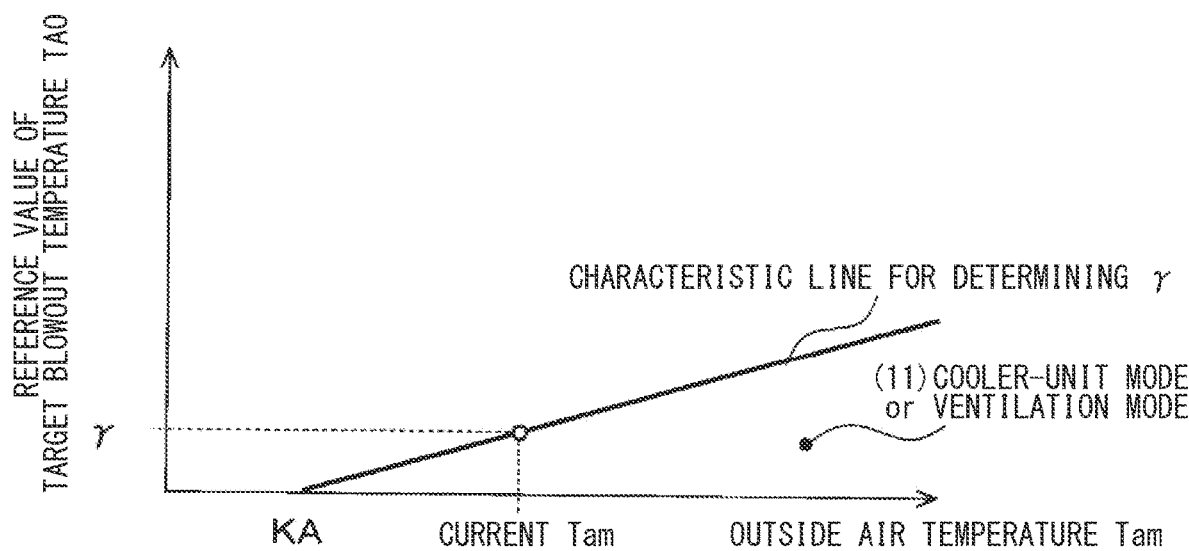
FIG. 7 is another control characteristic diagram for determining an air conditioning mode in the air conditioning control program of the first embodiment.

Therefore, in step S308, it is determined whether or not the target blowout temperature TAO is equal to or higher than the heating reference temperature γ. The heating reference temperature γ is determined by referring to a control map stored in advance in the controller 60 based on the outside air temperature Tam. In the present embodiment, as shown in FIG. 7, the heating reference temperature γ is determined to be lower as the outside air temperature Tam decreases. The heating reference temperature γ is set so that heating the blown air by the heater core 42 is effective for heating the target air-conditioned space.

When it is determined in step S308 that the target blowout temperature TAO is equal to or higher than the heating reference temperature γ, the blown air needs to be heated by the heater core 42. The process proceeds to step S309, and the air conditioning mode is set to heating. After the air conditioning mode is determined to be the heating mode, the process proceeds to step S40 in FIG. 3.

When it is determined in step S308 that the target blowout temperature TAO is not equal to or higher than the heating reference temperature γ, it is not necessary to heat the blown air by the heater core 42. In this case, the process proceeds to step S310, and the air conditioning mode of the refrigeration cycle device 10 is determined to be the other mode, in which it is not necessary to adjust the temperature of the blown air, such as a cooler-unit mode and a ventilation mode. After determining the air conditioning mode to be the other in step S310, the process proceeds to step S40 in FIG. 3.

In step S40, the reference cooling temperature KTB, which is a determination criterion for determining whether or not to cool the battery 80, is set. In the present embodiment, the battery temperature TB and the reference cooling temperature KTB are compared when determining whether or not to cool the battery 80. Then, when the battery temperature TB is equal to or higher than the reference cooling temperature KTB, it is determined that the battery 80 is cooled.

First, the reference cooling temperature KTB as a criterion for cooling the battery 80 will be described with reference to FIG. 8. The reference cooling temperature KTB of the present embodiment is defined with respect to the battery temperature TB, which is the temperature of the battery 80, and has a first reference cooling temperature KTB1 and a second reference cooling temperature KTB2.

As described above, the battery 80 is defined to be within an appropriate temperature range (in this embodiment, 15° C. or higher and 55° C. or lower) in which the charge/discharge capacity of the battery can be fully utilized.

When the battery temperature TB exceeds the upper limit temperature TBU (for example, 55° C.) of the temperature range, the output of the battery 80 decreases. When the battery temperature TB falls below the lower limit temperature TBL of the temperature range, the input/output of the battery 80 is restricted.

Therefore, considering the influence on the input/output of the battery 80, it is necessary to determine whether or not the battery 80 should be cooled so that the battery temperature TB is at least within an appropriate temperature range. That is, when the battery temperature TB is within an appropriate temperature range, it can be said that the input/output conditions of the battery 80 are satisfied.

Further, the deterioration tendency of the battery 80 is characterized in that the higher the battery temperature TB, the more easily the deterioration of the battery 80 progresses. If the deterioration of the battery 80 progresses, it has a long-term effect on the performance of the battery 80, such as a decrease in the charge/discharge capacity of the battery 80. As shown in FIG. 8, it is effective to keep the battery temperature TB as low as possible in order to suppress the progress of deterioration of the battery 80.

The first reference cooling temperature KTB1 of the present embodiment is determined according to a condition based on the input/output characteristics of the battery 80 with respect to the battery temperature TB. Specifically, the first reference cooling temperature KTB1 is set slightly lower than the upper limit temperature TBU (for example, 40° C.) in order to keep the battery temperature TB within an appropriate temperature range by cooling by the refrigeration cycle device 10. The first reference cooling temperature KTB1 corresponds to a first reference physical quantity.

That is, the refrigeration cycle device 10 starts cooling the battery 80 when the battery temperature TB reaches the first reference cooling temperature KTB1 or higher, so that the battery temperature TB can be maintained lower than the upper limit temperature TBU. That is, the refrigeration cycle device 10 can keep the input/output of the battery 80 in an appropriate state by determining whether or not the battery 80 needs to be cooled by using the first reference cooling temperature KTB1.

The second reference cooling temperature KTB2 is defined to satisfy both a condition based on the input/output characteristics of the battery 80 with respect to the battery temperature TB and a condition based on the deterioration tendency of the battery 80 with respect to the battery temperature TB. Specifically, the second reference cooling temperature KTB2 is set to a temperature slightly higher than the lower limit temperature TBL (for example, 15° C.) in order to keep the battery temperature TB as low as possible within an appropriate temperature range. The second reference cooling temperature KTB2 corresponds to a second reference physical quantity.

That is, as shown in FIG. 8, the second reference cooling temperature KTB2 is set lower than the first reference cooling temperature KTB1. Therefore, when determining the necessity of cooling the battery 80 using the second reference cooling temperature KTB2, the battery 80 is cooled earlier than the case where the first reference cooling temperature KTB1 is used (that is, in a state where the battery temperature TB is low).

That is, the refrigeration cycle device 10 starts cooling the battery 80 when the battery temperature TB reaches the second reference cooling temperature KTB2 or higher, thereby maintaining a state in which the battery temperature TB is within an appropriate temperature range. Thus, the input/output of the battery 80 can be kept in an appropriate state. Further, since the battery 80 is cooled so that the battery temperature TB becomes as low as possible in an appropriate temperature range, the progress of deterioration of the battery 80 can be suppressed.

Next, the specific processing content in step S40 will be described with reference to FIG. 9. In step S40, either the first reference cooling temperature KTB1 or the second reference cooling temperature KTB2 is set according to the air conditioning mode determined in step S30 (that is, the configuration of the refrigerant circuit in the refrigeration cycle device 10).

Specifically, in step S40, the controller 60 determines whether the refrigerant circuit related to the air conditioning mode defined in step S30 is a refrigerant circuit in which the outdoor heat exchanger 16 functions as a radiator, or a refrigerant circuit in which the outdoor heat exchanger 16 functions as a heat absorber.

When the outdoor heat exchanger 16 functions as a radiator, the controller 60 sets the first reference cooling temperature KTB1 as the reference cooling temperature KTB for determining the necessity of cooling the battery 80. When the outdoor heat exchanger 16 functions as a heat absorber, the controller 60 sets the second reference cooling temperature KTB2 as the reference cooling temperature KTB.

As described above, when the air conditioning mode is cooling, in the refrigeration cycle device 10, the water refrigerant heat exchanger 12 and the outdoor heat exchanger 16 function as radiator, and the indoor evaporator 18 functions as a heat absorber. Therefore, as shown in FIG. 9, the controller 60 sets the first reference cooling temperature KTB1 as the reference cooling temperature KTB when determining the necessity of cooling the battery 80.

When the air conditioning mode is serial dehumidifying heating, a refrigerant circuit is configured in which the water refrigerant heat exchanger 12 functions as a radiator and the indoor evaporator 18 functions as a heat absorber. The outdoor heat exchanger 16 in the serial dehumidifying heating functions as a radiator or a heat absorber according to the relationship between the saturation temperature of the refrigerant in the outdoor heat exchanger 16 and the outside air temperature Tam.

Therefore, when the air conditioning mode is serial dehumidifying heating, the controller 60 determines whether the outdoor heat exchanger 16 functions as a radiator or heat absorber based on the detection results of the outside air temperature sensor 62 and the third refrigerant temperature sensor 64c.

When the air conditioning mode is serial dehumidifying heating and the outdoor heat exchanger 16 functions as a radiator, the controller 60 sets the first reference cooling temperature KTB1 as the reference cooling temperature KTB. When the air conditioning mode is serial dehumidifying heating and the outdoor heat exchanger 16 functions as a heat absorber, the controller 60 sets the second reference cooling temperature KTB2 as the reference cooling temperature KTB.

When the air conditioning mode is parallel dehumidifying heating, the water refrigerant heat exchanger 12 functions as a radiator, and the outdoor heat exchanger 16 and the indoor evaporator 18 connected in parallel with respect to the flow of the refrigerant act as heat absorber. Therefore, the controller 60 sets the second reference cooling temperature KTB2 as the reference cooling temperature KTB.

When the air conditioning mode is heating, a refrigerant circuit is configured in which the water refrigerant heat exchanger 12 functions as a radiator and the outdoor heat exchanger 16 functions as a heat absorber. As a result, the controller 60 sets the second reference cooling temperature KTB2 as the reference cooling temperature KTB.

When the air conditioning mode is the other (for example, cooler-unit mode or ventilation mode), the outdoor heat exchanger 16 does not function as a heat absorber. Therefore, the controller 60 sets the first reference cooling temperature KTB1 as the reference cooling temperature KTB.

As shown in FIG. 9, after setting the reference cooling temperature KTB according to the air conditioning mode, the process completes step S40, and proceeds to step S50 of FIG. 3. The controller 60 that executes the process of step S40 corresponds to the determination reference setting unit 60g.

In the present embodiment, the battery temperature TB is used as a physical quantity having a correlation with the temperature of the battery 80, but the physical quantity is not limited to this. Another physical quantity which has a strong correlation with the temperature of the battery 80 can be appropriately used, such as the temperature of the low-temperature heat medium in the low-temperature heat medium circuit 50.

In the present embodiment, the reference cooling temperature KTB is adopted as the reference physical quantity, but not limited to this. The reference physical quantity is also appropriately changed according to the type of the physical quantity having a correlation with the temperature of the battery 80.

The processing after step S40 will be described again with reference to FIG. 3. After setting the reference cooling temperature KTB corresponding to the air conditioning mode in step S40, it is determined whether or not the air conditioning mode determined in step S30 is cooling in step S50. If it is determined in step S50 that the air conditioning mode is cooling, the process proceeds to step S60. If it is determined in step S50 that the air conditioning mode is not cooling, the process proceeds to step S90.

In step S60, it is determined whether or not the battery 80 needs to be cooled when the air conditioning mode is cooling. Specifically, in the present embodiment, when the battery temperature TB detected by the battery temperature sensor 68 is lower than the reference cooling temperature KTB defined in step S40, it is determined that it is not necessary to cool the battery 80.

Here, in step S30, the reference cooling temperature KTB for the cooling mode is set to the first reference cooling temperature KTB1 (40° C. in this embodiment). Therefore, in step S60, it is determined that the battery 80 needs to be cooled when the battery temperature TB is equal to or higher than the first reference cooling temperature KTB1. Therefore, the controller 60 that executes step S60 corresponds to the cooling necessity determination unit 60f.

When it is determined in step S60 that the battery 80 does not need to be cooled, the process proceeds to step S80, and (1) Air-cooling mode is selected as the operation mode of the refrigeration cycle device 10.

The operation in the air-cooling mode of step S80 will be described. The control map referred to in each operation mode in the following description is stored in the controller 60 in advance. The control maps may be equivalent to each other or may be different from each other depending on the operation modes.

In the air-cooling mode, the controller 60 determines the target evaporator temperature TEO. The target evaporator temperature TEO is determined by referring to the controlling map stored in advance in the controller 60 based on the target blowout temperature TAO. In the control map of the present embodiment, it is determined that the target evaporator temperature TEO increases as the target blowout temperature TAO increases.

The controller 60 determines the control state of each device to be controlled in order to realize the cooling mode. For example, the increase/decrease amount ΔIVO of the rotation speed of the compressor 11 is determined so that the evaporator temperature Tefin approaches the target evaporator temperature TEO, by feedback control method, based on a deviation between the target evaporator temperature TEO and the evaporator temperature Tefin.

The increase/decrease amount ΔEVC of the throttle opening of the air-cooling expansion valve 14b is determined, by feedback control method, based on a deviation between the target sub-cool degree SCO1 and the sub-cool degree SC1 of the refrigerant on the outlet side of the outdoor heat exchanger 16. At this time, the increase/decrease amount ΔEVC is determined so that the sub-cool degree SC1 of the refrigerant on the outlet side of the outdoor heat exchanger 16 approaches the target sub-cool degree SCO1.

Then, in order to switch the refrigeration cycle device 10 to set the refrigerant circuit for the cooling mode, the controller 60 sets the air-heating expansion valve 14a in a fully open state and the air-cooling expansion valve 14b in a throttle state in which the refrigerant decompressing action is exerted. The cooler-unit expansion valve 14c is fully closed by the controller 60. Further, the controller 60 closes the dehumidification on-off valve 15a and the air-heating on-off valve 15b. Further, the controller 60 outputs a control signal or a control voltage to each device to be controlled so that the control state defined for the cooling mode can be obtained, and returns to step S10.

As a result, the vapor compression refrigeration cycle is configured in the refrigeration cycle device 10 for the cooling mode. The refrigerant in this case flows in order of the compressor 11, the water refrigerant heat exchanger 12, (air-heating expansion valve 14a), the outdoor heat exchanger 16, the check valve 17, the air-cooling expansion valve 14b, the indoor evaporator 18, the evaporation pressure adjusting valve 20, the accumulator 21, and the compressor 11.

That is, in the refrigeration cycle device 10 for the cooling mode, the water refrigerant heat exchanger 12 and the outdoor heat exchanger 16 function as radiator to dissipate the refrigerant discharged from the compressor 11. Then, the air-cooling expansion valve 14b functions as a pressure reducing unit for reducing the pressure of the refrigerant, and the indoor evaporator 18 functions as a heat absorber.

According to this, the air can be cooled at the indoor evaporator 18, and simultaneously the high-temperature heat medium can be heated at the water refrigerant heat exchanger 12.

Therefore, in the vehicle air conditioner 1 in the cooling mode, a part of the blown air cooled by the indoor evaporator 18 can be reheated by the heater core 42 by adjusting the opening degree of the air mix door 34. That is, it is possible to cool the cabin by blowing out the air whose temperature has been adjusted so as to approach the target blowout temperature TAO.

When it is determined in step S60 that the battery 80 needs to be cooled, the process proceeds to step S70, and (5) Air-cooling cooler-unit mode is selected as the operation mode of the refrigeration cycle device 10.

In the air-cooling cooler-unit mode of step S70, the controller 60 determines the target evaporator temperature TEO, the increase/decrease amount ΔIVO in the rotation speed of the compressor 11, and the increase/decrease amount ΔEVC in the throttle opening of the air-cooling expansion valve 14b, and the opening SW of the air mix door 34 as in the air-cooling mode. Further, the controller 60 determines the target superheat degree SHCO of the refrigerant on the outlet side of the refrigerant passage of the chiller 19, and determines the increase/decrease amount ΔEVB of the throttle opening degree of the cooler-unit expansion valve 14c.

In the air-cooling cooler-unit mode, the increase/decrease amount ΔEVB is determined by the feedback control method based on the deviation between the target superheat degree SHCO and the superheat degree SHC of the refrigerant flowing out from the chiller 19, so that the superheat degree SHC of the refrigerant flowing out from the chiller 19 approaches the target superheat degree SHCO.

Then, in order to switch the refrigeration cycle device 10 to set the refrigerant circuit in the air-cooling cooler-unit mode, the controller 60 puts the air-heating expansion valve 14a in a fully open state and puts the air-cooling expansion valve 14b and the cooler-unit expansion valve 14c in a throttled state. Further, the controller 60 closes the dehumidification on-off valve 15a and closes the air-heating on-off valve 15b. Then, the controller 60 outputs a control signal or a control voltage to each device to be controlled so that the control state defined for the air-cooling cooler-unit mode can be obtained, and returns to step S10.

Therefore, in the refrigeration cycle device 10 in the air-cooling cooler-unit mode, a vapor compression refrigeration circuit is formed. The refrigerant in this case flows in order of the compressor 11, the water refrigerant heat exchanger 12, (air-heating expansion valve 14a), the outdoor heat exchanger 16, the check valve 17, the cooling expansion valve 14b, the indoor evaporator 18, the evaporation pressure adjusting valve 20, the accumulator 21, and the compressor 11. At the same time, the refrigerants flows in order of the compressor 11, the water refrigerant heat exchanger 12, (air-heating expansion valve 14a), the outdoor heat exchanger 16, the check valve 17, the cooler-unit expansion valve 14c, the chiller 19, the evaporation pressure adjusting valve 20, the accumulator 21 and the compressor 11.

That is, in the refrigeration cycle device 10 in the air-cooling cooler-unit mode, the water refrigerant heat exchanger 12 and the outdoor heat exchanger 16 function as radiator to dissipate the refrigerant discharged from the compressor 11, and the indoor evaporator 18 acts as a heat absorber. Then, the air-cooling expansion valve 14b and the cooler-unit expansion valve 14c connected in parallel to the indoor evaporator 18 function as a pressure reducing unit, and the chiller 19 functions as a heat absorber.

According to this, the air can be cooled at the indoor evaporator 18, and simultaneously the high-temperature heat medium can be heated at the water refrigerant heat exchanger 12. Further, the chiller 19 can cool the low-pressure side heat medium.

Therefore, in the vehicle air conditioner 1 in the air-cooling cooler-unit mode, a part of the blown air cooled by the indoor evaporator 18 can be reheated by the heater core 42 by adjusting the opening degree of the air mix door 34. That is, it is possible to cool the cabin by blowing out the air whose temperature has been adjusted so as to approach the target blowout temperature TAO.

Furthermore, it is possible to cool the battery 80 by making the low-temperature heat medium cooled by the chiller 19 to flow into the cooling heat exchange unit 52. Therefore, the controller 60 that executes step S70 corresponds to the cooling control unit 60h.

In step S90, it is determined whether or not the air conditioning mode determined in step S30 is the serial dehumidifying heating mode. If it is determined in step S90 that the air conditioning mode is the serial dehumidifying heating mode, the process proceeds to step S100. If it is determined in step S90 that the air conditioning mode is not the serial dehumidifying heating mode, the process proceeds to step S130.

In step S100, it is determined whether or not the battery 80 needs to be cooled when the air conditioning mode is the serial dehumidifying heating mode. Specifically, in step S100, it is determined that the battery 80 needs to be cooled when the battery temperature TB is equal to or higher than the reference cooling temperature KTB determined in association with the serial dehumidifying heating mode in step S30. That is, the controller 60 that executes step S100 corresponds to the cooling necessity determination unit 60f.

If it is determined in step S100 that cooling of the battery 80 is not necessary, the process proceeds to step S120, and (2) Serial dehumidifying heating mode is selected as the operation mode of the refrigeration cycle device 10.

In the serial dehumidifying heating mode of step S120, the controller 60 determines the target evaporator temperature TEO, the increase/decrease amount ΔIVO of the rotation speed of the compressor 11, and the opening SW of the air mix door 34, as in the air-cooling mode.

Further, the controller 60 determines the target high-temperature heat medium temperature TWHO of the high-temperature heat medium so that the blown air can be heated by the heater core 42. The target high-temperature heat medium temperature TWHO is determined based on the target blowout temperature TAO and the efficiency of the heater core 42, so that the target high-temperature heat medium temperature TWHO rises as the target blowout temperature TAO rises.

Further, the controller 60 determines a change amount ΔKPN1 of the opening degree pattern KPN1. The opening degree pattern KPN1 is a parameter for determining a combination of the throttle degree of the air-heating expansion valve 14a and the throttle degree of the air-cooling expansion valve 14b. Specifically, in the serial dehumidifying heating mode, the opening degree pattern KPN1 increases as the target blowout temperature TAO increases. As the opening degree pattern KPN1 increases, the throttle degree of the air-heating expansion valve 14a decreases, and the throttle degree of the air-cooling expansion valve 14b increases.

Then, in order to switch the refrigeration cycle device 10 to set the refrigerant circuit in the serial dehumidifying heating mode, the controller 60 puts the air-heating expansion valve 14a in a throttled state, the air-cooling expansion valve 14b in a throttled state, and sets the cooler-unit expansion valve 14c in a fully closed state. Further, the controller 60 closes the dehumidification on-off valve 15a and the air-heating on-off valve 15b. Further, the controller 60 outputs a control signal or a control voltage to each device to be controlled so that the control state defined for the serial dehumidifying heating mode can be obtained, and returns to step S10.

As a result, the vapor compression refrigeration cycle is configured in the refrigeration cycle device 10 in the serial dehumidifying heating mode. The refrigerant in this case flows in order of the compressor 11, the water refrigerant heat exchanger 12, the air-heating expansion valve 14a, the outdoor heat exchanger 16, the check valve 17, the air-cooling expansion valve 14b, the indoor evaporator 18, the evaporation pressure adjusting valve 20, the accumulator 21 and the compressor 11.

That is, in the refrigeration cycle device 10 in the serial dehumidifying heating mode, the water refrigerant heat exchanger 12 functions as a radiator that dissipates heat from the refrigerant discharged from the compressor 11. The air-heating expansion valve 14a and the air-cooling expansion valve 14b function as a pressure reducing unit, and the indoor evaporator 18 functions as a heat absorber.

Further, when a saturation temperature of the refrigerant in the outdoor heat exchanger 16 is higher than the outside air temperature Tam, a cycle in which the outdoor heat exchanger 16 functions as a radiator is configured. When the saturation temperature of the refrigerant in the outdoor heat exchanger 16 is lower than the outside air temperature Tam, a cycle in which the outdoor heat exchanger 16 functions as a heat absorber is configured.

According to this, the blown air can be cooled at the indoor evaporator 18, and simultaneously the high-temperature heat medium can be heated at the water refrigerant heat exchanger 12. Therefore, in the vehicle air conditioner 1 in the serial dehumidifying heating mode, it is possible to dehumidify and heat the cabin by discharging the blown air which is cooled and dehumidified by the indoor evaporator 18 and is reheated by the heater core 42.

Further, when the saturation temperature of the refrigerant in the outdoor heat exchanger 16 is higher than the outside air temperature Tam, the opening pattern KPN1 is increased as the target blowout temperature TAO rises. Therefore, the saturation temperature of refrigerant in the outdoor heat exchanger 16 decreases and the difference from the outside air temperature Tam decreases. Thereby, it is possible to increase a heat dissipation amount from the refrigerant in the water refrigerant heat exchanger 12 by reducing a heat dissipation amount from the refrigerant in the outdoor heat exchanger 16.

When the saturation temperature of the refrigerant in the outdoor heat exchanger 16 is lower than the outside air temperature Tam, the opening pattern KPN1 is increased as the target blowout temperature TAO rises. Therefore, the saturation temperature of refrigerant in the outdoor heat exchanger 16 decreases and the temperature difference from the outside air temperature Tam increases. As a result, it is possible to increase a heat dissipation amount from the refrigerant in the water refrigerant heat exchanger 12 by increasing a heat absorption amount from the refrigerant in the outdoor heat exchanger 16.

That is, in the serial dehumidifying heating mode, it is possible to increase the heat dissipation amount from the refrigerant to the high-temperature heat medium in the water refrigerant heat exchanger 12 by increasing the opening degree pattern KPN1 as the target blowout temperature TAO increases. Therefore, in the serial dehumidifying heating mode, it is possible to improve the air heating capacity of the heater core 42 as the target blowout temperature TAO increases.

When it is determined in step S100 that the battery 80 needs to be cooled, the process proceeds to step S110, and (6) Serial dehumidifying, heating and cooler-unit mode is selected as the operation mode of the refrigeration cycle device 10.

In the serial dehumidifying, heating and cooler-unit mode of step S110, the controller 60 determines the target evaporator temperature TEO, the increase/decrease amount ΔIVO of the rotation speed of the compressor 11, the change amount ΔKPN1 of the opening pattern KPN1, and the opening SW of the mix door 34, as in the serial dehumidifying heating mode. Further, the controller 60 determines the target superheat degree SHCO, the increase/decrease amount ΔEVB of the throttle opening of the cooler-unit expansion valve 14c, and the target low-temperature heat medium temperature TWLO, as in the air-cooling cooler-unit mode.

Then, in order to switch the refrigeration cycle device 10 to set the refrigerant circuit in the serial dehumidifying, heating and cooler-unit mode, the controller 60 sets the air-heating expansion valve 14a in a throttled state, and sets the air-cooling expansion valve 14b and the cooler-unit expansion valve 14c in a throttled state. Further, the controller 60 closes the dehumidification on-off valve 15a and closes the air-heating on-off valve 15b. Further, the controller 60 outputs a control signal or a control voltage to each device to be controlled so that the control state defined for the serial dehumidifying, heating and cooler-unit mode can be obtained, and returns to step S10.

As a result, in the serial dehumidifying, heating and cooler-unit mode, a vapor compression refrigeration cycle is configured. The refrigerant in this case flows in order of the compressor 11, the water refrigerant heat exchanger 12, the air-heating expansion valve 14a, the outdoor heat exchanger 16, the check valve 17, the cooling expansion valve 14b, the indoor evaporator 18, the evaporation pressure adjusting valve 20, the accumulator 21 and the compressor 11. At the same time, the refrigerant flows in order of the compressor 11, the water refrigerant heat exchanger 12, the air-heating expansion valve 14a, the outdoor heat exchanger 16, the check valve 17, the cooler-unit expansion valve 14c, the chiller 19, the evaporation pressure adjusting valve 20, the accumulator 21, and the compressor 11.

That is, in the refrigeration cycle device 10 in the serial dehumidifying, heating and cooler-unit mode, the water refrigerant heat exchanger 12 functions as a radiator, and the indoor evaporator 18 and the chiller 19 function as heat absorber. Further, the air-heating expansion valve 14a and the air-cooling expansion valve 14b function as a pressure reducing unit, and the air-cooling expansion valve 14b connected in parallel to the air-cooling expansion valve 14b and the indoor evaporator 18 function as a pressure reducing unit.

Further, when a saturation temperature of the refrigerant in the outdoor heat exchanger 16 is higher than the outside air temperature Tam, a cycle in which the outdoor heat exchanger 16 functions as a radiator is configured. When the saturation temperature of the refrigerant in the outdoor heat exchanger 16 is lower than the outside air temperature Tam, a cycle in which the outdoor heat exchanger 16 functions as a heat absorber is configured.

According to this, the blown air can be cooled at the indoor evaporator 18, and simultaneously the high-temperature heat medium can be heated at the water refrigerant heat exchanger 12. Further, the chiller 19 can cool the low-pressure side heat medium.

Therefore, in the refrigeration cycle device 10 in the serial dehumidifying, heating and cooler-unit mode, it is possible to dehumidify and heat the cabin by discharging the blown air which is cooled and dehumidified by the indoor evaporator 18, and is reheated by the heater core 42. At this time, it is possible to improve the air heating capacity of the heater core 42 by increasing the opening degree pattern KPN1, similar to the serial dehumidifying heating mode.

Furthermore, it is possible to cool the battery 80 by making the low-temperature heat medium cooled by the chiller 19 to flow into the cooling heat exchange unit 52. Therefore, the controller 60 that executes step S110 corresponds to the cooling control unit 60h.

In step S130, it is determined whether or not the air conditioning mode determined in step S30 is the parallel dehumidifying heating mode. If it is determined in step S130 that the air conditioning mode is the parallel dehumidifying heating mode, the process proceeds to step S140. If it is determined in step S130 that the air conditioning mode is not the parallel dehumidifying heating mode, the process proceeds to step S170 in FIG. 4.

In step S140, it is determined whether or not the battery 80 needs to be cooled when the air conditioning mode is the parallel dehumidifying heating mode. Specifically, in step S140, when the battery temperature TB is equal to or higher than the second reference cooling temperature KTB2 determined in association with the parallel dehumidifying heating mode in step S30, it is determined that it is necessary to cool the battery 80. That is, the controller 60 that executes step S140 corresponds to the cooling necessity determination unit 60f.

If it is determined in step S140 that cooling of the battery 80 is not necessary, the process proceeds to step S160, and (3) Parallel dehumidifying heating mode is selected as the operation mode of the refrigeration cycle device 10.

In the parallel dehumidifying heating mode of step S160, the controller 60 determines the target high-temperature heat medium temperature TWHO as in the serial dehumidifying heating mode. Further, the controller 60 determines the increase/decrease amount ΔIVO of the rotation speed of the compressor 11 in the parallel dehumidifying heating mode. In the parallel dehumidifying heating mode, the increase/decrease amount ΔIVO is determined so that the high-temperature heat medium temperature TWH approaches the target high-temperature heat medium temperature TWHO by the feedback control method based on a deviation between the target high-temperature heat medium temperature TWHO and the high-temperature heat medium temperature TWH.

Then, the controller 60 determines the change amount ΔKPN1 of the opening degree pattern KPN1. In the parallel dehumidifying heating mode, the superheat degree SHE is determined to approach the target superheat degree SHEO, by the feedback control method, based on a deviation between the target superheat degree SHEO and the superheat degree SHE of the refrigerant on the outlet side of the indoor evaporator 18.

In the parallel dehumidifying heating mode, as the opening degree pattern KPN1 increases, the throttle degree of the air-heating expansion valve 14a decreases and the throttle degree of the air-cooling expansion valve 14b increases. Therefore, when the opening degree pattern KPN1 increases, the flow amount of the refrigerant flowing into the indoor evaporator 18 increases, and the superheat degree SHE of the refrigerant on the outlet side of the indoor evaporator 18 decreases. Further, the controller 60 calculates the opening degree SW of the air mix door 34 as in the air-cooling mode.

Then, in order to switch the refrigeration cycle device 10 to set the refrigerant circuit in the parallel dehumidifying heating mode, the controller 60 sets the air-heating expansion valve 14a and the air-cooling expansion valve 14b in throttled state, and sets the cooler-unit expansion valve 14c in a fully closed state. Further, the controller 60 opens the dehumidification on-off valve 15a and opens the air-heating on-off valve 15b. Further, the controller 60 outputs a control signal or a control voltage to each device to be controlled so that the control state defined for the parallel dehumidifying heating mode can be obtained, and returns to step S10.

As a result, the vapor compression refrigeration cycle is configured in the refrigeration cycle device 10 in the parallel dehumidifying heating mode. In this case, the refrigerant flows and circulates in order of the compressor 11, the water refrigerant heat exchanger 12, the air-heating expansion valve 14a, the outdoor heat exchanger 16, the heating passage 22b, the accumulator 21, and the compressor 11. At the same time, the refrigerant flows and circulates in order of the compressor 11, the water refrigerant heat exchanger 12, the bypass passage 22a, the air-cooling expansion valve 14b, the indoor evaporator 18, the evaporation pressure adjusting valve 20, the accumulator 21, and the compressor 11.

That is, in the refrigeration cycle device 10 in the parallel dehumidifying heating mode, the water refrigerant heat exchanger 12 functions as a radiator for dissipating the refrigerant discharged from the compressor 11, and the air-heating expansion valve 14a functions as a pressure reducing unit. The outdoor heat exchanger 16 functions as a heat absorber. Further, the air-heating expansion valve 14a and the air-cooling expansion valve 14b connected in parallel to the outdoor heat exchanger 16 function as a pressure reducing unit, and the indoor evaporator 18 functions as a heat absorber.

According to this, the air can be cooled at the indoor evaporator 18, and simultaneously the high-temperature heat medium can be heated at the water refrigerant heat exchanger 12. Therefore, in the vehicle air conditioner 1 in the parallel dehumidifying heating mode, it is possible to dehumidify and heat the cabin by discharging the air which is cooled and dehumidified by the indoor evaporator 18, and is reheated by the heater core 42.

Further, in the refrigeration cycle device 10 in the parallel dehumidifying heating mode, the outdoor heat exchanger 16 and the indoor evaporator 18 are connected in parallel relative to the refrigerant flow, and the evaporation pressure adjusting valve 20 is arranged on the downstream side of the indoor evaporator 18. Thereby, the refrigerant evaporation temperature in the outdoor heat exchanger 16 can be made lower than the refrigerant evaporation temperature in the indoor evaporator 18.

Therefore, in the parallel dehumidifying heating mode, the heat absorption amount of the refrigerant in the outdoor heat exchanger 16 can be increased more than that in the serial dehumidifying heating mode, and the heat dissipation amount of the refrigerant in the water refrigerant heat exchanger 12 can be increased. As a result, in the parallel dehumidifying heating mode, the air can be reheated with a higher heating capacity than in the serial dehumidifying heating mode.

When it is determined in step S140 that the battery 80 needs to be cooled, the process proceeds to step S150, and (7) Parallel dehumidifying, heating and cooler-unit mode is selected as the operation mode of the refrigeration cycle device 10.

In the parallel dehumidifying, heating and cooler-unit mode of step S150, the controller 60 determines the control state of various controlled devices as in the parallel dehumidifying heating mode. Thereby, the target high-temperature heat medium temperature TWHO, the increase/decrease amount ΔIVO of the rotation speed of the compressor 11, the target superheat degree SHEO, the change amount ΔKPN1 of the opening pattern KPN1, and the opening SW of the air mix door 34 are determined. Further, the controller 60 determines the target superheat degree SHCO, the increase/decrease amount ΔEVB of the throttle opening of the cooler-unit expansion valve 14c, and the target low-temperature heat medium temperature TWLO, as in the air-cooling cooler-unit mode.

Then, in order to switch the refrigeration cycle device 10 to set the refrigerant circuit in the parallel dehumidifying, heating and cooler-unit mode, the controller 60 sets the air-heating expansion valve 14a, the air-cooling expansion valve 14b, and the cooler-unit expansion valve 14c in throttled state, respectively. Further, the controller 60 opens the dehumidification on-off valve 15a and opens the air-heating on-off valve 15b. Further, the controller 60 outputs a control signal or a control voltage to each device to be controlled so that the control state defined for the parallel dehumidifying, heating and cooler-unit mode can be obtained, and returns to step S10.

As a result, the vapor compression refrigeration cycle is configured in the refrigeration cycle device 10 in the parallel dehumidifying, heating and cooler-unit mode. In this case, the refrigerant flows and circulates in order of the compressor 11, the water refrigerant heat exchanger 12, the air-heating expansion valve 14a, the outdoor heat exchanger 16, the heating passage 22b, the accumulator 21, and the compressor 11. At the same time, the refrigerant flows and circulates in order of the compressor 11, the water refrigerant heat exchanger 12, the bypass passage 22a, the air-cooling expansion valve 14b, the indoor evaporator 18, the evaporation pressure adjusting valve 20, the accumulator 21, and the compressor 11. Further, the refrigerant in this case flows and circulates in order of the compressor 11, the water refrigerant heat exchanger 12, the bypass passage 22a, the cooler-unit expansion valve 14c, the chiller 19, the evaporation pressure adjusting valve 20, the accumulator 21, and the compressor 11.

That is, in the refrigeration cycle device 10 in the parallel dehumidifying, heating and cooler-unit mode, the water refrigerant heat exchanger 12 functions as a radiator for dissipating the refrigerant discharged from the compressor 11, and the air-heating expansion valve 14a functions as a pressure reducing unit. The outdoor heat exchanger 16 functions as a heat absorber. Further, the air-heating expansion valve 14a and the air-cooling expansion valve 14b connected in parallel to the outdoor heat exchanger 16 function as a pressure reducing unit, and the indoor evaporator 18 functions as a heat absorber. Further, the air-heating expansion valve 14a and the cooler-unit expansion valve 14c connected in parallel to the outdoor heat exchanger 16 function as pressure reducing unit, and the chiller 19 functions as a heat absorber.

According to this, the blown air can be cooled by the indoor evaporator 18, and the high-temperature heat medium can be heated by the water refrigerant heat exchanger 12. Further, the chiller 19 can cool the low-pressure side heat medium.

Therefore, in the vehicle air conditioner 1 in the parallel dehumidifying, heating and cooler-unit mode, it is possible to dehumidify and heat the cabin by discharging the blown air which is cooled and dehumidified by the indoor evaporator 18, and is reheated by the heater core 42. At this time, it is possible to reheat the air with a heating capacity higher than that in the serial dehumidifying, heating and cooler-unit mode by lowering the refrigerant evaporation temperature in the outdoor heat exchanger 16 below the refrigerant evaporation temperature in the indoor evaporator 18.

Furthermore, it is possible to cool the battery 80 by making the low-temperature heat medium cooled by the chiller 19 to flow into the cooling heat exchange unit 52. That is, the controller 60 that executes step S150 corresponds to the cooling control unit 60h.

Subsequently, the processing after step S170 will be described with reference to FIG. 4. In step S170, it is determined whether or not the air conditioning mode determined in step S30 is the heating mode. If it is determined in step S170 that the air conditioning mode is the heating mode, the process proceeds to step S180. If it is determined in step S170 that the air conditioning mode is not the heating mode, the process proceeds to step S260.

In step S180, it is determined whether or not the battery 80 needs to be cooled when the air conditioning mode is the heating mode. Specifically, in step S180, when the battery temperature TB is equal to or higher than the second reference cooling temperature KTB2 determined in step S30, it is determined that the battery 80 needs to be cooled. That is, the controller 60 that executes step S180 corresponds to the cooling necessity determination unit 60f.

When it is determined in step S180 that the battery 80 needs to be cooled, the process proceeds to step S190. If it is determined in step S170 that cooling of the battery 80 is not necessary, the process proceeds to step S200, and (4) Heating mode is selected as the operation mode of the refrigeration cycle device 10.

In the heating mode of step S200, the controller 60 determines the target high-temperature heat medium temperature TWHO of the high-temperature heat medium and the increase/decrease amount ΔIVO of the rotation speed of the compressor 11 as in the parallel dehumidifying heating mode.

The controller 60 determines the target supercooling degree SCO2 of the refrigerant flowing out from the refrigerant passage of the water refrigerant heat exchanger 12. The target supercooling degree SCO2 is determined so that the coefficient of performance (COP) of the cycle approaches the maximum value based on the suction temperature of the blown air flowing into the indoor evaporator 18 or the outside air temperature Tam.

Further, the controller 60 determines the increase/decrease amount ΔEVH of the throttle opening degree of the air-heating expansion valve 14a. The increase/decrease amount ΔEVH is determined based on the deviation between the target supercooling degree SCO2 and the supercooling degree SC2 of the refrigerant flowing out from the water refrigerant heat exchanger 12 by the feedback control method so that the cooling degree SC2 of the refrigerant flowing out from the water refrigerant heat exchanger 12 approaches the target supercooling degree SCO2. The controller 60 calculates the opening degree SW of the air mix door 34 in the same manner as in the cooling mode.

Then, in order to switch the refrigeration cycle device 10 to set the refrigerant circuit in the heating mode, the controller 60 puts the air-heating expansion valve 14a in a throttled state, and puts the air-cooling expansion valve 14b and the cooler-unit expansion valve 14c in a fully closed state. Further, the controller 60 closes the dehumidification on-off valve 15a and opens the air-heating on-off valve 15b. Further, the controller 60 outputs a control signal or a control voltage to each controlled device so that a control state defined for the heating mode can be obtained, and returns to step S10.

As a result, the vapor compression refrigeration cycle is configured in the refrigeration cycle device 10 in the heating mode. In this case, the refrigerant flows and circulates in order of the compressor 11, the water refrigerant heat exchanger 12, the air-heating expansion valve 14a, the outdoor heat exchanger 16, the heating passage 22b, the accumulator 21, and the compressor 11.

That is, in the refrigeration cycle device 10 in the heating mode, the water refrigerant heat exchanger 12 functions as a radiator for dissipating the refrigerant discharged from the compressor 11, and the air-heating expansion valve 14a functions as a pressure reducing unit. Then, the outdoor heat exchanger 16 functions as a heat absorber.

According to this, it is possible to heat the high-temperature heat medium at the water refrigerant heat exchanger 12. Therefore, in the vehicle air conditioner 1 in the heating mode, it is possible to heat the cabin by discharging the blown air heated by the heater core 42.

If it is determined in step S180 that the battery 80 needs to be cooled and the process proceeds to step S190, it is necessary to perform both heating of the cabin and cooling of the battery 80. Therefore, in the refrigeration cycle device 10, it is necessary to adjust appropriately the heat dissipation amount of the refrigerant dissipated to the high-temperature heat medium in the water refrigerant heat exchanger 12 and the heat absorbing amount of the refrigerant absorbed from the low-temperature heat medium in the chiller 19.

Figure 4:
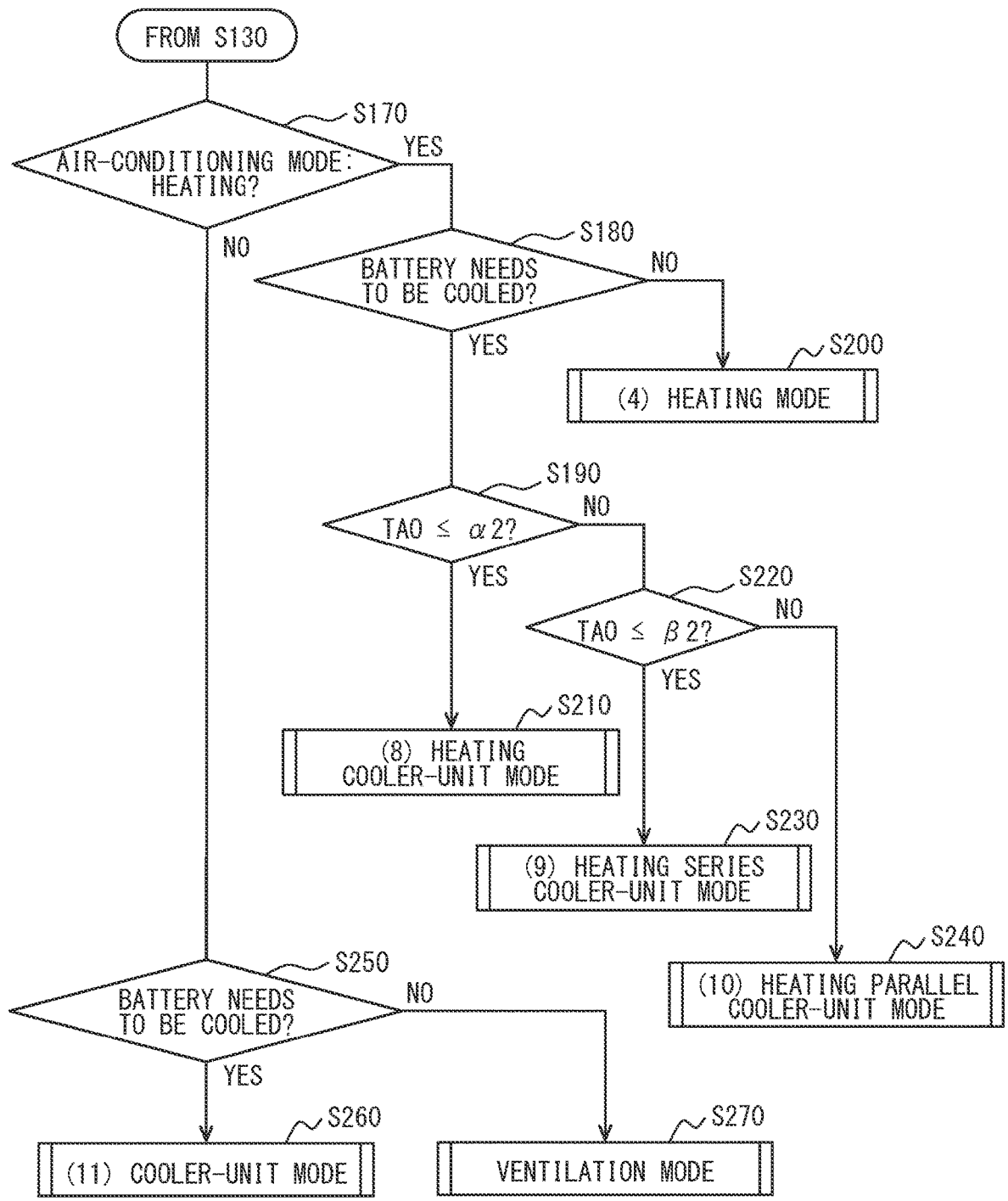
FIG. 4 is a flowchart showing another part of the control process of the air conditioning control program of the first embodiment.

Therefore, in the refrigeration cycle device 10 of the present embodiment, when it is necessary to both heating the cabin and cooling the battery 80, as shown in steps S190 to S240 of FIG. 4, three operation modes are switched from each other. That is, (8) Heating cooler-unit mode, (9) Heating series cooler-unit mode, and (10) Heating parallel cooler-unit mode are appropriately switched according to the cabin environment and the condition of the battery 80.

In step S190, it is determined whether or not the target blowout temperature TAO is equal to or lower than the low-temperature cooling reference temperature α2. The low-temperature cooling reference temperature α2 is determined based on the outside air temperature Tam with reference to a control map stored in advance in the controller 60.

Figure 10:
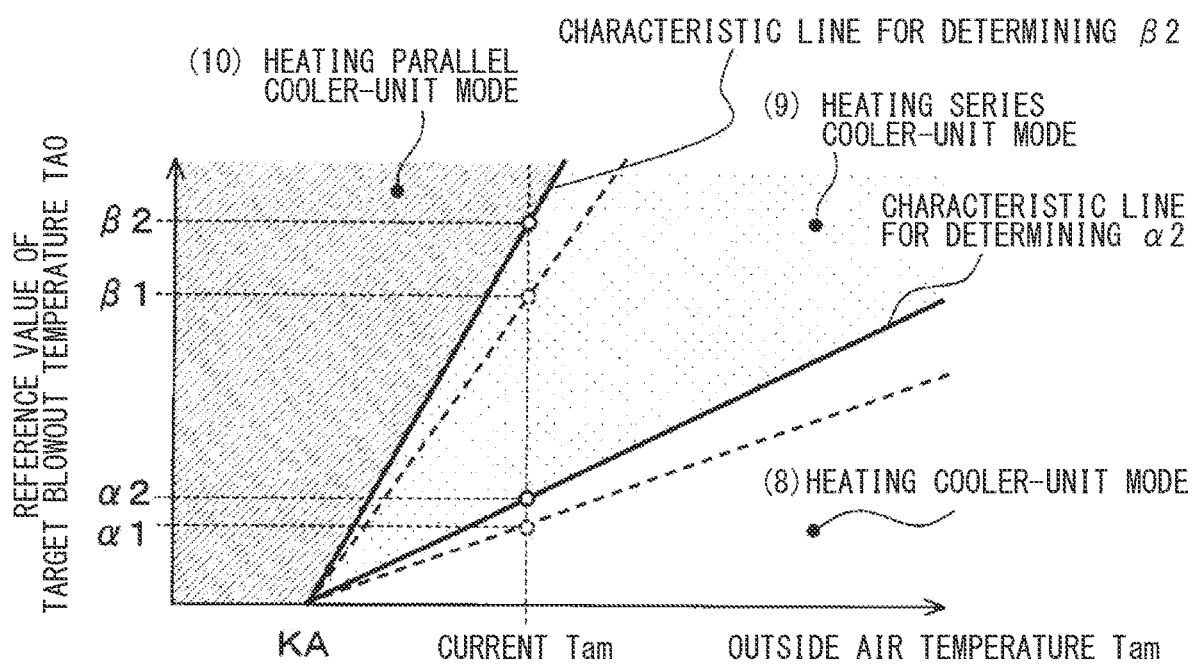
FIG. 10 is another control characteristic diagram for switching an operation mode of the air conditioning control program of the first embodiment.

In the present embodiment, as shown in FIG. 10, it is determined that the low-temperature cooling reference temperature α2 becomes lower as the outside air temperature Tam decreases. Further, at the same outside air temperature Tam, the low-temperature cooling reference temperature α2 is determined to be higher than the cooling reference temperature α1.

If it is determined in step S190 that the target blowout temperature TAO is not equal to or lower than the low-temperature cooling reference temperature α2, the process proceeds to step S220. If it is determined in step S190 that the target blowout temperature TAO is less than or equal to the low-temperature cooling reference temperature α2, the process proceeds to step S210, and (8) Heating cooler-unit mode is selected as the operation mode of the refrigeration cycle device 10.

In the heating cooler-unit mode of step S210, the controller 60 determines the target low-temperature heat medium temperature TWLO of the low-temperature heat medium as in the air-cooling cooler-unit mode so that the battery 80 can be cooled by the cooling heat exchange unit 52. Then, the controller 60 determines the target supercooling degree SCO1 of the refrigerant flowing out from the outdoor heat exchanger 16.

Further, the controller 60 determines the increase/decrease amount ΔIVO of the rotation speed of the compressor 11. In the heating cooler-unit mode, the increase/decrease amount ΔIVO is determined so that the first low-temperature heat medium temperature TWL1 approaches the target low-temperature heat medium temperature TWLO, by the feedback control method, based on a deviation between the target low-temperature heat medium temperature TWLO and the first low-temperature heat medium temperature TWL1.

Further, the controller 60 determines the increase/decrease amount ΔEVB of the throttle opening degree of the cooler-unit expansion valve 14*c*. The increase/decrease amount ΔEVB is determined so that the sub-cool degree SC1 of the refrigerant on the outlet side of the outdoor heat exchanger 16 approaches the target sub-cool degree SCO1, by the feedback control method, based on a deviation between the target sub-cool degree SCO1 and the sub-cool degree SC1 of the refrigerant on the outlet side of the outdoor heat exchanger 16. The sub-cool degree SC1 is calculated similar to the air-cooling mode. Further, the controller 60 calculates the opening degree SW of the air mix door 34 as in the air-cooling mode.

Then, in order to switch the refrigeration cycle device 10 to set the refrigerant circuit in the heating cooler-unit mode, the controller 60 sets the air-heating expansion valve 14*a* in a fully open state, the air-cooling expansion valve 14*b* in a fully closed state, and sets the cooler-unit expansion valve 14*c* in a throttle state. Further, the controller 60 closes the dehumidification on-off valve 15*a* and the air-heating on-off valve 15*b*. Further, the controller 60 outputs a control signal or a control voltage to each controlled device so that the control state defined for the heating cooler-unit mode can be obtained, and returns to step S10.

Therefore, in the refrigeration cycle device 10 in the heating cooler-unit mode, a vapor compression refrigeration circuit is formed. The refrigerant in this case flows in order of the compressor 11, the water refrigerant heat exchanger 12, (air-heating expansion valve 14*a*), the outdoor heat exchanger 16, the check valve 17, the cooler-unit expansion valve 14*c*, the chiller 19, the evaporation pressure adjusting valve 20, the accumulator 21 and the compressor 11.

That is, in the refrigeration cycle device 10 in the heating cooler-unit mode, the water refrigerant heat exchanger 12 and the outdoor heat exchanger 16 function as radiator to dissipate the refrigerant discharged from the compressor 11. Further, the cooler-unit expansion valve 14*c* functions as a pressure reducing unit for reducing the pressure of the refrigerant, and the chiller 19 functions as an evaporator.

According to this, the high-temperature heat medium can be heated at the water refrigerant heat exchanger 12 and simultaneously the low-temperature heat medium can be cooled at the chiller 19.

Therefore, in the vehicle air conditioner 1 in the heating cooler-unit mode, it is possible to heat the cabin by discharging the air which is heated by the heater core 42. Furthermore, it is possible to cool the battery 80 by making the low-temperature heat medium cooled by the chiller 19 to flow into the cooling heat exchange unit 52. Therefore, the controller 60 that executes step S210 corresponds to the cooling control unit 60*h*.

In step S220, it is determined whether or not the target blowout temperature TAO is equal to or lower than the high-temperature cooling reference temperature β2. The high-temperature cooling reference temperature β2 is determined based on the outside air temperature Tam with reference to a control map stored in advance in the controller 60.

In the present embodiment, as shown in FIG. 10, similarly to the low-temperature cooling reference temperature α2, the high-temperature cooling reference temperature β2 becomes lower as the outside air temperature Tam decreases. Further, the high-temperature cooling reference temperature β2 is determined to be higher than the low-temperature cooling reference temperature α2. Further, at the same outside air temperature Tam, the high-temperature cooling reference temperature β2 is determined to be higher than the dehumidification reference temperature β1.

If it is determined in step S220 that the target blowout temperature TAO is equal to or lower than the high-temperature cooling reference temperature β2, the process proceeds to step S230, and (9) Heating series cooler-unit mode is selected as the operation mode of the refrigeration cycle device 10.

In the heating series cooler-unit mode of step S230, the controller 60 determines the target low-temperature heat medium temperature TWLO and the increase/decrease amount ΔIVO of the rotation speed of the compressor 11 as in the heating cooler-unit mode. Further, the controller 60 determines the target high-temperature heat medium temperature TWHO of the high-temperature heat medium as in the serial dehumidifying heating mode. Further, the controller 60 calculates the opening degree SW of the air mix door 34 as in the air-cooling mode.

Then, the controller 60 determines the change amount ΔKPN2 of the opening degree pattern KPN2. The opening degree pattern KPN2 is a parameter for determining a combination of a throttle degree of the air-heating expansion valve 14*a* and a throttle degree of the cooler-unit expansion valve 14*c*. Specifically, in the heating series cooler-unit mode, the opening pattern KPN2 increases as the target blowout temperature TAO rises. As the opening degree pattern KPN2 increases, the throttle degree of the air-heating expansion valve 14*a* decreases, and the throttle degree of the cooler-unit expansion valve 14*c* increases.

Then, in order to switch the refrigeration cycle device 10 to set the refrigerant circuit in the heating series cooler-unit mode, the controller 60 sets the air-heating expansion valve 14a and the cooler-unit expansion valve 14c in throttled state, and the air-cooling expansion valve 14b in a fully closed state. Further, the controller 60 closes the dehumidification on-off valve 15a and the air-heating on-off valve 15b. Further, the controller 60 outputs a control signal or a control voltage to each device to be controlled so that the control state defined for the heating series cooler-unit mode can be obtained, and returns to step S10.

As a result, in the refrigeration cycle device 10 in the heating series cooler-unit mode, a vapor compression refrigeration cycle is configured. The refrigerant in this case flows in order of the compressor 11, the water refrigerant heat exchanger 12, the air-heating expansion valve 14a, the outdoor heat exchanger 16, the check valve 17, the cooler-unit expansion valve 14c, the chiller 19, the evaporation pressure adjusting valve 20, the accumulator 21 and the compressor 11.

That is, in the refrigeration cycle device 10 in the heating series cooler-unit mode, the water refrigerant heat exchanger 12 functions as a radiator that dissipates the refrigerant discharged from the compressor 11, and the air-heating expansion valve 14a and the cooler-unit expansion valve 14c function as a pressure reducing unit. The chiller 19 functions as a heat absorber.

Further, when a saturation temperature of the refrigerant in the outdoor heat exchanger 16 is higher than the outside air temperature Tam, a cycle in which the outdoor heat exchanger 16 functions as a radiator is configured. When the saturation temperature of the refrigerant in the outdoor heat exchanger 16 is lower than the outside air temperature Tam, a cycle in which the outdoor heat exchanger 16 functions as a heat absorber is configured.

According to this, the high-temperature heat medium can be heated at the water refrigerant heat exchanger 12 and simultaneously the low-temperature heat medium can be cooled at the chiller 19.

Therefore, in the vehicle air conditioner 1 in the heating series cooler-unit mode, it is possible to heat the cabin by discharging the air which is heated by the heater core 42. Furthermore, it is possible to cool the battery 80 by making the low-temperature heat medium cooled by the chiller 19 to flow into the cooling heat exchange unit 52. That is, the controller 60 that executes step S230 corresponds to the cooling control unit 60h.

Furthermore, when the saturation temperature of the refrigerant in the outdoor heat exchanger 16 is higher than the outside air temperature Tam, the opening degree pattern KPN2 is increased in accordance with the increase in the target blowout temperature TAO, thereby the saturation temperature of the refrigerant in the outdoor heat exchanger 16 is lowered to reduce a difference to the outside air temperature Tam. Thereby, it is possible to increase a heat dissipation amount form the refrigerant in the water refrigerant heat exchanger 12 by reducing a heat dissipation amount from the refrigerant in the outdoor heat exchanger 16.

Furthermore, when the saturation temperature of the refrigerant in the outdoor heat exchanger 16 is lower than the outside air temperature Tam, the opening degree pattern KPN2 is increased in accordance with the increase in the target blowout temperature TAO, thereby the saturation temperature of the refrigerant in the outdoor heat exchanger 16 is lowered to increase a difference to the outside air temperature Tam. As a result, it is possible to increase a heat dissipation amount from the refrigerant in the water refrigerant heat exchanger 12 by increasing a heat absorption amount to the refrigerant in the outdoor heat exchanger 16.

That is, in the heating series cooler-unit mode, the amount of heat released from the refrigerant in the water refrigerant heat exchanger 12 to the high-temperature heat medium can be increased by increasing the opening pattern KPN2 as the target blowout temperature TAO rises. Therefore, in the heating series cooler-unit mode, it is possible to improve the air heating capacity of the heater core 42 as the target blowout temperature TAO increases.

As a result, in the heating series cooler-unit mode, the air can be heated with a higher heating capacity than in the heating cooler-unit mode. In other words, the heating cooler-unit mode is an operation mode in which the air is heated with a lower heating capacity than the heating series cooler-unit mode.

If it is determined in step S220 that the target blowout temperature TAO is not equal to or lower than the high-temperature cooling reference temperature β2, the process proceeds to step S240, and (10) Heating parallel cooler-unit mode is selected as the operation mode of the refrigeration cycle device 10.

In the heating parallel cooler-unit mode of step S240, the controller 60 determines the target high-temperature heat medium temperature TWHO of the high-temperature heat medium as in the serial dehumidifying heating mode. Further, the controller 60 calculates the opening degree SW of the air mix door 34 as in the air-cooling mode. Further, the controller 60 determines the target low-temperature heat medium temperature TWLO of the low-temperature heat medium as in the air-cooling cooler-unit mode.

Then, the controller 60 determines the increase/decrease amount ΔIVO of the rotation speed of the compressor 11. In the heating parallel cooler-unit mode, the increase/decrease amount ΔIVO is determined by the feedback control method based on a deviation between the target high-temperature heat medium temperature TWHO and the high-temperature heat medium temperature TWH so that the high-temperature heat medium temperature TWH approaches the target high-temperature heat medium temperature TWHO. The controller 60 determines the target superheat degree SHCO of the refrigerant on the outlet side of the refrigerant passage of the chiller 19.

Further, the controller 60 determines the change amount ΔKPN2 of the opening degree pattern KPN2. In the heating parallel cooler-unit mode, the superheat degree SHC is determined to approach the target superheat degree SHCO, by the feedback control method, based on a deviation between the target superheat degree SHCO and the superheat degree SHC of the refrigerant on the outlet side of the chiller 19.

In the heating parallel cooler-unit mode, as the opening pattern KPN2 increases, the throttle opening of the air-heating expansion valve 14a decreases, and the throttle opening of the cooler-unit expansion valve 14c increases. Therefore, when the opening degree pattern KPN2 increases, the flow amount of the refrigerant flowing into the refrigerant passage of the chiller 19 increases, and the superheat degree SHC of the refrigerant on the outlet side of the refrigerant passage of the chiller 19 decreases.

Then, in order to switch the refrigeration cycle device 10 to set the refrigerant circuit in the heating parallel cooler-unit mode, the controller 60 sets the air-heating expansion valve 14a and the cooler-unit expansion valve 14c in a throttled state, and the air-cooling expansion valve 14b in a fully closed state. Further, the controller 60 opens the dehumidification on-off valve 15a and opens the air-heating on-off valve 15b. Further, the controller 60 outputs a control signal or a control voltage to each device to be controlled so that the control state defined for the heating parallel cooler-unit mode can be obtained, and returns to step S10.

As a result, in the refrigeration cycle device 10 in the heating parallel cooler-unit mode, a vapor compression refrigeration cycle is configured. In this case, the refrigerant flows and circulates in order of the compressor 11, the water refrigerant heat exchanger 12, the air-heating expansion valve 14a, the outdoor heat exchanger 16, the heating passage 22b, the accumulator 21, and the compressor 11. At the same time, the refrigerant flows and circulates in order of the compressor 11, the water refrigerant heat exchanger 12, the bypass passage 22a, the cooler-unit expansion valve 14c, the chiller 19, the evaporation pressure adjusting valve 20, the accumulator 21, and the compressor 11.

That is, in the refrigeration cycle device 10 in the heating parallel cooler-unit mode, the water refrigerant heat exchanger 12 functions as a radiator for dissipating the refrigerant discharged from the compressor 11, and the air-heating expansion valve 14a functions as a pressure reducing unit. The outdoor heat exchanger 16 functions as an evaporator. Further, the air-heating expansion valve 14a and the cooler-unit expansion valve 14c connected in parallel to the outdoor heat exchanger 16 function as a pressure reducing unit, and the chiller 19 functions as an evaporator.

According to this, the high-temperature heat medium can be heated at the water refrigerant heat exchanger 12 and simultaneously the low-temperature heat medium can be cooled at the chiller 19.

Therefore, in the vehicle air conditioner 1 in the heating parallel cooler-unit mode, it is possible to heat the cabin with the air heated by the heater core 42. Furthermore, it is possible to cool the battery 80 by making the low-temperature heat medium cooled by the chiller 19 to flow into the cooling heat exchange unit 52. That is, the controller 60 that executes step S240 corresponds to the cooling control unit 60h.

Further, in the refrigeration cycle device 10 in the heating parallel cooler-unit mode, the outdoor heat exchanger 16 and the chiller 19 are connected in parallel to the refrigerant flow, and the evaporation pressure adjusting valve 20 is arranged on the downstream side of the refrigerant passage of the chiller 19. Thereby, the refrigerant evaporation temperature in the outdoor heat exchanger 16 can be made lower than the refrigerant evaporation temperature in the refrigerant passage of the chiller 19.

Therefore, in the heating parallel cooler-unit mode, the heat absorption amount of the refrigerant in the outdoor heat exchanger 16 can be increased more than that in the heating series cooler-unit mode, and the heat dissipation amount of the refrigerant in the water refrigerant heat exchanger 12 can be increased. As a result, in the heating parallel cooler-unit mode, the blown air can be reheated with a heating capacity higher than that in the heating series cooler-unit mode.

Subsequently, a case where the process proceeds from step S170 to step S250 will be described. When the other mode is determined as the air conditioning mode in step S30, the process proceeds from step S170 to step S250, as it is not necessary to adjust the temperature of the air by the refrigeration cycle device 10.

Therefore, in step S250, it is determined whether or not the battery 80 needs to be cooled when it is not necessary to adjust the temperature of the air by the refrigeration cycle device 10. Specifically, in step S250, when the battery temperature TB is equal to or higher than the reference cooling temperature KTB determined in step S30, it is determined that the battery 80 needs to be cooled.

If it is determined in step S250 that the battery 80 needs to be cooled, the process proceeds to step S260, and (11) Cooler-unit mode is selected as the operation mode of the refrigeration cycle device 10.

In the cooling mode of step S260, the controller 60 determines the control state of various controlled devices as in the heating cooler-unit mode. As a result, the target low-temperature heat medium temperature TWLO, the increase/decrease amount ΔIVO of the rotation speed of the compressor 11, the target supercooling degree SCO1, the increase/decrease amount ΔEVB of the throttle opening of the cooler-unit expansion valve 14c, and the opening SW of the air mix door 34 are determined.

Then, in order to switch the refrigeration cycle device 10 to set the refrigerant circuit for the cooler-unit mode, the controller 60 sets the air-heating expansion valve 14a in the fully open state, the air-cooling expansion valve 14b in the fully closed state, and the cooler-unit expansion valve 14c in the throttle state. Further, the controller 60 closes the dehumidification on-off valve 15a and the air-heating on-off valve 15b. Further, the controller 60 outputs a control signal or a control voltage to each controlled device so that a control state defined for the cooler-unit mode can be obtained, and returns to step S10.

Therefore, in the refrigeration cycle device 10 in the cooler-unit mode, a vapor compression refrigeration circuit is formed. The refrigerant in this case flows in order of the compressor 11, the water refrigerant heat exchanger 12, (air-heating expansion valve 14a), the outdoor heat exchanger 16, the check valve 17, the cooler-unit expansion valve 14c, the chiller 19, the evaporation pressure adjusting valve 20, the accumulator 21 and the compressor 11.

That is, in the refrigeration cycle device 10 in the cooler-unit mode, the outdoor heat exchanger 16 functions as a radiator for dissipating the refrigerant discharged from the compressor 11, the cooler-unit expansion valve 14c functions as a pressure reducing unit, and the chiller 19 functions as a heat absorber.

According to this, the chiller 19 can cool the low-temperature heat medium. Therefore, in the vehicle air conditioner 1 in the cooler-unit mode, it is possible to cool the battery 80 by making the low-temperature heat medium cooled by the chiller 19 to flow into the cooling heat exchange unit 52. Therefore, the controller 60 that executes step S260 corresponds to the cooling control unit 60h.

If it is determined in step S250 that the battery 80 does not need to be cooled, the process proceeds to step S270, and the ventilation mode is selected as the operation mode of the refrigeration cycle device 10.

The ventilation mode is an operation mode in which the compressor 11 is stopped and the blower 32 is operated according to the setting signal set by the air volume setting switch. When the operation in the ventilation mode is finished, the process returns to step S10. In addition, in step S250, when it is determined that the cooling of the battery 80 is not necessary, operating the refrigeration cycle device 10 for conditioning air for the cabin and cooling of the battery are not necessary.

In the air-conditioning control program of the present embodiment, the operation mode of the refrigeration cycle device 10 is switched as described above. Further, this air conditioning control program controls the operation of the high-temperature heat medium pump 41 of the high-temperature heat medium circuit 40 constituting the heating unit, and the low-temperature heat medium pump 51 of the low-temperature heat medium circuit 50 constituting the cooler unit.

Specifically, the controller 60 controls the operation of the high-temperature heat medium pump 41 so as to perform a reference pumping capability for each predetermined operation mode regardless of the operation mode of the refrigeration cycle device 10.

Therefore, in the high-temperature heat medium circuit 40, when the high-temperature heat medium is heated in the water passage of the water refrigerant heat exchanger 12, the heated high-temperature heat medium is pumped to the heater core 42. The high-temperature heat medium that has flowed into the heater core 42 exchanges heat with the blown air. Accordingly, the blown air is heated. The high-temperature heat medium that has flowed out of the heater core 42 is sucked into the high-temperature heat medium pump 41 and is pumped to the water refrigerant heat exchanger 12.

Further, the controller 60 controls the operation of the low-temperature heat medium pump 51 so as to perform a reference pumping capability for each predetermined operation mode regardless of the operation mode of the refrigeration cycle device 10.

According to the refrigeration cycle device 10 of the present embodiment, when the outdoor heat exchanger 16 functions as a heat absorber in a refrigerant circuit, the second reference cooling temperature KTB2 is set as reference cooling temperature KTB for determining the necessity of cooling the battery 80. The second reference cooling temperature KTB2 is set lower than the first reference cooling temperature KTB1 set when the outdoor heat exchanger 16 functions as a radiator.

Therefore, in the refrigeration cycle device 10, when the outdoor heat exchanger 16 functions as a heat absorber in a refrigerant circuit, the cooling of the battery 80 can be started in a state where the temperature of the battery 80 is lower than that in case where the outdoor heat exchanger 16 functions as a radiator in a refrigerant circuit.

As a result, the refrigeration cycle device 10 can cool the battery 80 in more situations when the outdoor heat exchanger 16 functions as a heat absorber, and can keep the battery temperature TB lower within the temperature range. That is, the refrigeration cycle device 10 can suppress the progress of deterioration of the battery 80 in this case.

Further, the refrigerant circuit in which the outdoor heat exchanger 16 functions as a heat absorber is configured when the blown air is heated by using the heat absorbed from the outside air by the outdoor heat exchanger 16. Specifically, the air conditioning mode is one of the heating, the parallel dehumidifying heating, and the serial dehumidifying heating satisfying a certain condition.

Therefore, when the outdoor heat exchanger 16 functions as a heat absorber in a refrigerant circuit, the air can be heated using the heat generated in the battery 80 in addition to the outside air, by executing cooling of the battery 80.

That is, according to the refrigeration cycle device 10, when the outdoor heat exchanger 16 functions as a heat absorber, when the blown air is heated, efficient and comfortable air conditioning can be realized using the heat absorbed from the battery 80 in addition to the heat absorbed from the outside air.

Then, as shown in FIG. 9, the second reference cooling temperature KTB2 is higher than the lower limit temperature TBL within an appropriate temperature range determined from the input/output characteristics of the battery 80 and lower than the first reference cooling temperature KTB1. That is, the second reference cooling temperature KTB2 is set to be as low as possible within an appropriate temperature range of the battery 80. Further, the tendency of deterioration of the battery 80 tends to progress as the battery temperature TB increases. That is, the lower the battery temperature TB, the more the progress of deterioration of the battery 80 can be suppressed.

Therefore, the input/output limitation of the battery 80 can be avoided and the deterioration of the battery 80 can be suppressed by setting the second reference cooling temperature KTB2 to be as low as possible within an appropriate temperature range determined from the input/output characteristics of the battery 80.

The first reference cooling temperature KTB1 is set slightly lower than the upper limit temperature TBU in an appropriate temperature range determined from the input/output characteristics of the battery 80 and higher than the second reference cooling temperature KTB2. As a result, the refrigeration cycle device 10 can cool the battery 80 in a manner that the input/output restriction of the battery 80 is avoided even when the outdoor heat exchanger 16 functions as a radiator in a refrigerant circuit.

Second Embodiment

Figure 11:
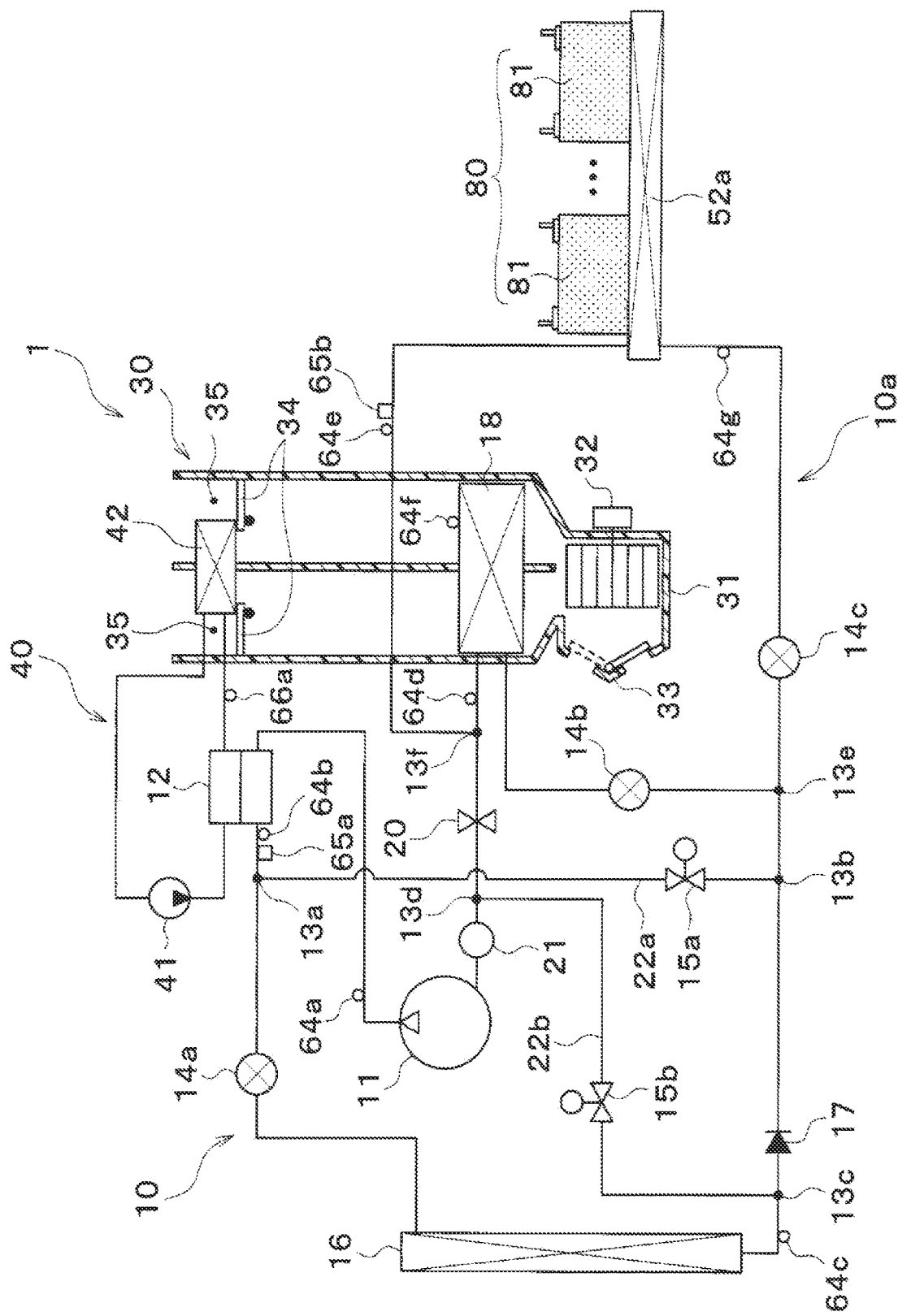
FIG. 11 is an overall configuration diagram of a vehicle air conditioner according to a second embodiment.

In this embodiment, as shown in FIG. 11, the low-temperature heat medium circuit 50 is eliminated with respect to the first embodiment. In FIG. 11, the same or equal parts as those in the first embodiment are designated by the same reference numerals. This also applies to the following drawings.

More specifically, in the refrigeration cycle device 10 of the present embodiment, the inlet side of the cooling heat exchange unit 52a is connected to the outlet of the cooler-unit expansion valve 14c. The cooling heat exchange unit 52a is a so-called direct cooler to cool the battery 80 by evaporating the refrigerant flowing through the refrigerant passage and making the refrigerant to absorb heat. Therefore, in the present embodiment, the cooling heat exchange unit 52a constitutes a cooler unit.

It is desirable that the cooling heat exchange unit 52a has plural refrigerant flow paths connected in parallel with each other so that the entire area of the battery 80 can be uniformly cooled. The other inlet of the sixth three-way joint 13f is connected to the outlet of the cooling heat exchange unit 52a.

A cooling heat exchange unit inlet temperature sensor 64g is connected to the inlet side of the controller 60 of the present embodiment. The cooling heat exchange unit inlet temperature sensor 64g is a temperature detector that detects a temperature of the refrigerant flowing into the refrigerant passage of the cooling heat exchange unit 52.

Further, the fifth refrigerant temperature sensor 64e of the present embodiment detects a temperature T5 of the refrigerant flowing out from the refrigerant passage of the cooling heat exchange unit 52. The second refrigerant pressure sensor 65b of the present embodiment detects a pressure P2 of the refrigerant flowing out from the refrigerant passage of the cooling heat exchange unit 52a.

Further, the controller 60 of the present embodiment closes the cooler-unit expansion valve 14c when the temperature T7 detected by the cooling heat exchange unit inlet temperature sensor 64g is equal to or lower than the reference inlet side temperature, in an operation mode in which the cooler-unit expansion valve 14c is in the throttle state. Thus, the battery 80 can be restricted from being unnecessarily cooled, such that the output of the battery 80 is not reduced.

The other configurations and operations of the refrigeration cycle device 10 are similar to those of the first embodiment. According to this, advantages similar to those of the first embodiment can be obtained. That is, also in the refrigeration cycle device 10 of the present embodiment, the temperature of the blown air can be continuously adjusted in a wide range while appropriately adjusting the temperature of the battery 80.

Third Embodiment

Figure 12:
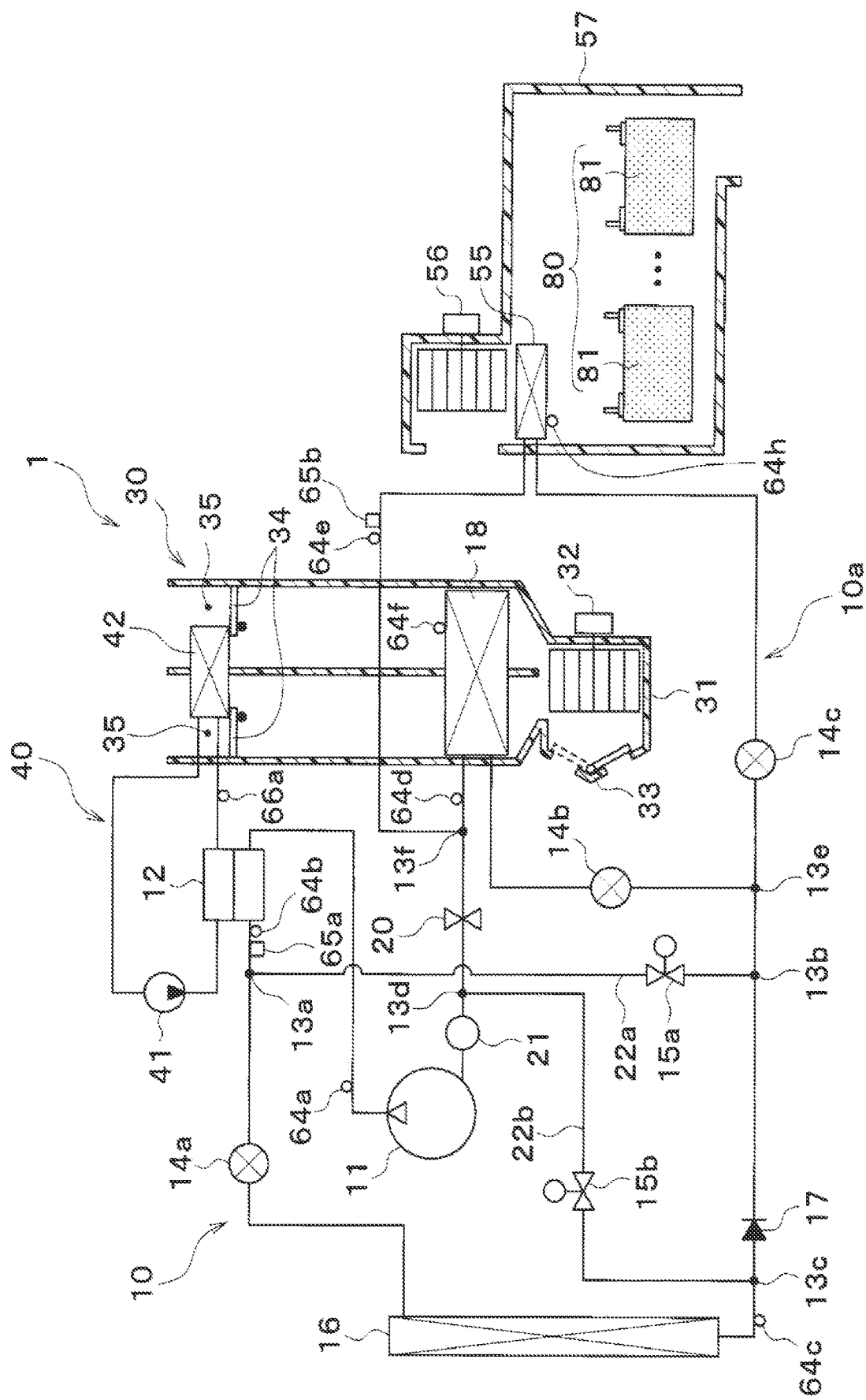
FIG. 12 is an overall configuration diagram of a vehicle air conditioner according to a third embodiment.

In this embodiment, as shown in FIG. 12, the low-temperature heat medium circuit 50 is eliminated, and a battery evaporator 55, a battery blower 56, and a battery case 57 are added to the first embodiment.

More specifically, the battery evaporator 55 is a cooling heat exchanger to cool air for the cooler unit by making the refrigerant to absorb heat, by evaporating the refrigerant due to heat exchange between the refrigerant decompressed by the cooler-unit expansion valve 14c and the air blown from the battery blower 56. One inlet of the sixth three-way joint 13f is connected to a refrigerant outlet of the battery evaporator 55.

The battery blower 56 blows the air cooled by the battery evaporator 55 toward the battery 80. The battery blower 56 is an electric blower whose rotation speed (blowing capacity) is controlled by a control voltage output from the controller 60.

The battery case 57 houses the battery evaporator 55, the battery blower 56, and the battery 80, and forms an air passage for guiding the air blown from the battery blower 56 to the battery 80. The air passage may be a circulation passage that guides the cooling air blown to the battery 80 toward the suction side of the battery blower 56.

Therefore, in the present embodiment, the battery blower 56 blows the cooling air cooled by the battery evaporator 55 onto the battery 80, whereby the battery 80 is cooled. That is, in this embodiment, the battery evaporator 55, the battery blower 56, and the battery case 57 form a cooler unit.

Further, a battery evaporator temperature sensor 64h is connected to the input side of the controller 60 of the present embodiment. The battery evaporator temperature sensor 64h is a temperature detector that detects a refrigerant evaporation temperature (battery evaporator temperature) T7 in the battery evaporator 55. The battery evaporator temperature sensor 64h of the present embodiment specifically detects a heat exchange fin temperature of the battery evaporator 55.

In addition, the controller 60 of the present embodiment controls the operation of the battery blower 56 regardless of the operation mode so as to exhibit a reference air blowing capacity for each predetermined operation mode.

Further, in the present embodiment, the cooler-unit expansion valve 14c is closed when the temperature T8 detected by the battery evaporator temperature sensor 64h is equal to or lower than the reference battery evaporator temperature, in an operation mode in which the cooler-unit expansion valve 14c is in the throttle state. Thus, the battery 80 can be restricted from being unnecessarily cooled, and the output of the battery 800 can be restricted from being reduced.

The other configurations and operations of the refrigeration cycle device 10 are similar to those of the first embodiment. According to this, advantages similar to that of the first embodiment can be obtained.

Fourth Embodiment

Figure 13:
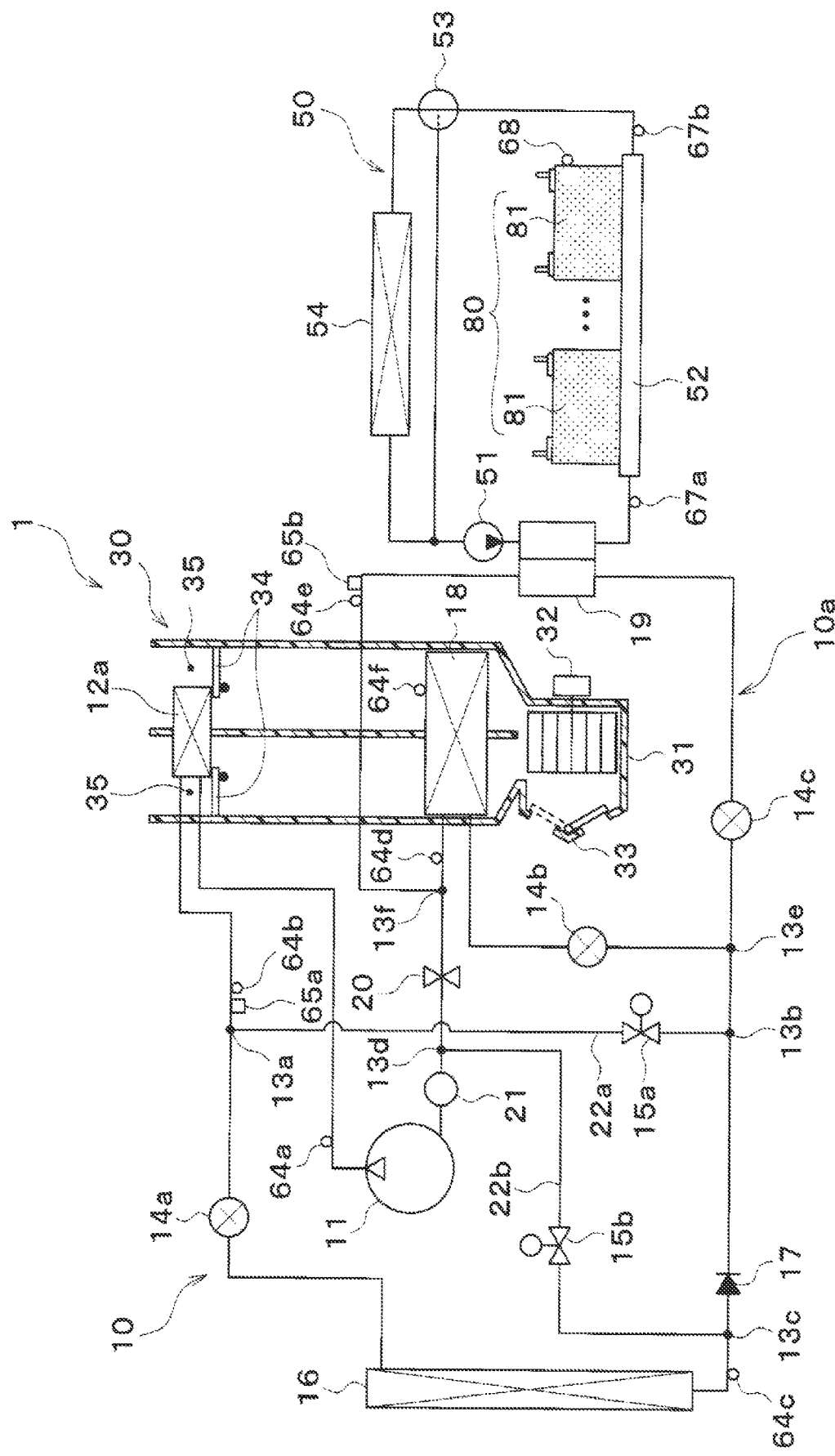
FIG. 13 is an overall configuration diagram of a vehicle air conditioner according to a fourth embodiment.

In the present embodiment, as shown in FIG. 13, the high-temperature heat medium circuit 40 is eliminated and the indoor condenser 12a is adopted with respect to the first embodiment.

More specifically, the indoor condenser 12a is a heating unit to condense the refrigerant and simultaneously to heat the blown air, by heat exchange between the high-temperature high-pressure refrigerant discharged from the compressor 11 and the blown air. The indoor condenser 12a is arranged in the air-conditioning case 31 of the indoor air-conditioning unit 30 similar to the heater core 42 described in the first embodiment.

The other configurations and operations of the refrigeration cycle device 10 are similar to those of the first embodiment. According to this, advantages similar to that of the first embodiment can be obtained.

Fifth Embodiment

Figure 14:
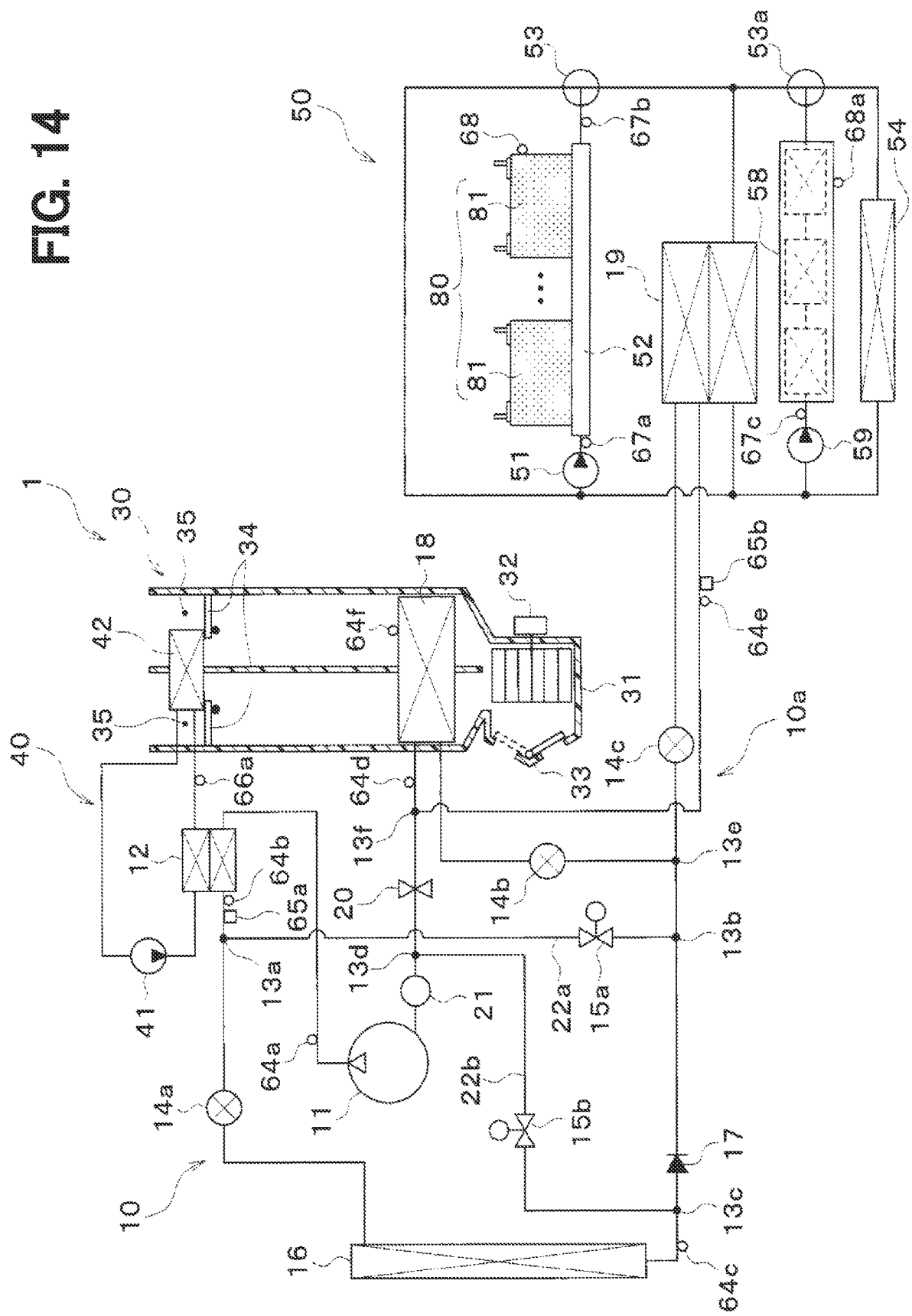
FIG. 14 is an overall configuration diagram of a vehicle air conditioner according to a fifth embodiment.

In this embodiment, as shown in FIG. 14, the configurations and the connection modes in the low-temperature heat medium circuit 50 are changed with respect to the first embodiment.

The low-temperature heat medium circuit 50 according to the fifth embodiment includes a heat medium passage of the chiller 19, a low-temperature heat medium pump 51, a cooling heat exchange unit 52, a three-way valve 53, an equipment three-way valve 53a, a low-temperature radiator 54, an in-vehicle device 58, and an equipment heat medium pump 59.

The low-temperature heat medium pump 51 is a water pump that pumps the low-temperature heat medium to the inlet side of the cooling heat exchange unit 52. The equipment heat medium pump 59 is a water pump that pumps the low-temperature heat medium to the inlet side of the heat medium passage in the in-vehicle device 58. The basic configuration of the equipment heat medium pump 59 is the same as that of the low-temperature heat medium pump 51 of the first embodiment.

The in-vehicle device 58 is a heat generating device that generates waste heat as operating, such as an inverter, a motor generator, an ADAS control device, and the like. The inverter and the motor generator have characteristics that the amount of heat generated increases as the traveling load (for example, traveling speed) of the vehicle increases. The in-vehicle device 58 corresponds to a target device to be cooled. The inlet side of the equipment three-way valve 53a is connected to the outlet side of the heat medium passage in the in-vehicle device 58.

The cooling heat exchange unit 52 has plural metal heat medium passages to be in contact with the battery cells 81. That is, the cooling heat exchange unit 52 is a heat exchange unit that cools the battery 80 by exchanging heat between the low-temperature heat medium flowing through the heat medium passage and the battery cell 81. The inlet of the three-way valve 53 is connected to the outlet of the cooling heat exchange unit 52.

The cooling heat exchange unit 52 may be integrally formed with the battery 80, for example, by arranging a heat medium passage to a dedicated case for housing the battery cells 81 arranged in a stacking manner.

One outlet side of the three-way valve 53 and one outlet side of the equipment three-way valve 53a are connected to the outlet of the heat medium passage of the chiller 19. The three-way valve 53 and the equipment three-way valve 53a are electric three-way flow rate adjusting valve having one inlet and two outlets and capable of continuously adjusting the passage area ratio of the two outlets. The three-way valve 53 and the equipment three-way valve 53a are controlled by a control signal output from the controller 60.

The suction side of the low-temperature heat medium pump 51 is connected to one outlet of the three-way valve 53, and the inlet side of the heat medium passage of the chiller 19 is connected to the other outlet of the three-way valve 53. The inlet side of the cooling heat exchange unit 52 is connected to the discharge port of the low-temperature heat medium pump 51.

The heat medium inlet side of the low-temperature radiator 54 is connected to one outlet of the equipment three-way valve 53a, and the inlet side of the heat medium passage of the chiller 19 is connected to the other outlet of the equipment three-way valve 53a.

The low-temperature radiator 54 is a heat exchanger in which heat is exchanged between the low-temperature heat medium circulating in the low-temperature heat medium circuit 50 and outside air blown by a cooling fan (not shown), so as to dissipate the heat of the low-temperature heat medium to the outside air.

The low-temperature radiator 54 is arrange on the front side within the drive device compartment. Therefore, the wind can be applied to the low-temperature radiator 54 when the vehicle is traveling. The low-temperature radiator 54 is arranged in series with the outdoor heat exchanger 16 in the air flow. The low-temperature radiator 54 may be arranged in parallel with the outdoor heat exchanger 16 in the air flow. The low-temperature radiator 54 may be integrally formed with the outdoor heat exchanger 16 and the like.

The suction port of the equipment heat medium pump 59 and the inlet side of the heat medium passage of the chiller 19 are connected to the heat medium outlet of the low-temperature radiator 54. The inlet side of the heat medium passage of the in-vehicle device 58 is connected to the discharge port of the equipment heat medium pump 59.

In the low-temperature heat medium circuit 50, the low-temperature heat medium pump 51, the equipment heat medium pump 59, the three-way valve 53 and the second three-way valve 53b control the flow rate of the low-temperature heat medium flowing into the chiller 19, the cooling heat exchange unit 52, the low-temperature radiator 54, and the in-vehicle device 58. Thereby, in the low-temperature heat medium circuit 50, the amount of heat absorbed by the low-temperature heat medium in the cooling heat exchange unit 52 from the battery 80 and the amount of heat absorbed by the low-temperature heat medium from the in-vehicle device 58 are adjusted. The chiller 19 and each component of the low-temperature heat medium circuit 50 correspond to a cooler unit that evaporates the refrigerant flowing out from the cooler-unit expansion valve 14c to cool the battery 80 and the in-vehicle device 58.

In addition to the sensors described above, the controller 60 according to the fifth embodiment is connected to the third low-temperature heat medium temperature sensor 67c and the equipment temperature sensor 68a. The third low-temperature heat medium temperature sensor 67c is arranged on the inlet side of the heat medium passage of the in-vehicle device 58, and is a temperature detector that detects the third low-temperature side heat medium temperature TWL3 which is a temperature of the low-temperature heat medium flowing into the heat medium passage of the in-vehicle device 58.

The equipment temperature sensor 68a is a temperature detector that detects the temperature of the in-vehicle device 58. Like the battery temperature sensor 68, the equipment temperature sensor 68a of the present embodiment has plural temperature sensors and detects temperatures at plural locations in the in-vehicle device 58. Therefore, the controller 60 can detect the temperature of each device (such as inverter or motor generator) constituting the in-vehicle device 58, and can also detect the temperature difference between the devices. Further, as the temperature of the in-vehicle device 58, the average value of the detection values by the temperature sensors can be adopted.

Figure 15:
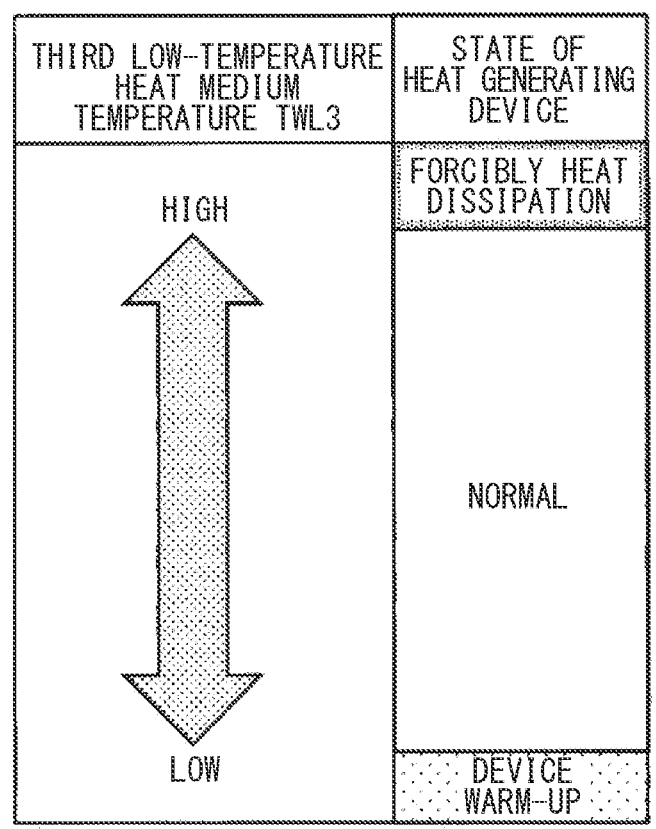
FIG. 15 is an explanatory diagram showing a relationship between a state of a heat generating device and a third low-temperature heat medium temperature in the fifth embodiment.

Here, the relationship between the state of the in-vehicle device 58 arranged in the low-temperature heat medium circuit 50 and the third low-temperature heat medium temperature TWL3 will be described with reference to FIG. 15. The third low-temperature heat medium temperature TWL3 indicates the temperature of the low-temperature heat medium flowing in from the inlet side in the heat medium passage of the in-vehicle device 58, and is detected by the third low-temperature heat medium temperature sensor 67c. That is, the third low-temperature heat medium temperature TWL3 has a strong correlation with the temperature of the in-vehicle device 58 detected by the equipment temperature sensor 68a.

As described above, since the in-vehicle device 58 is composed of, for example, an inverter, a motor generator, an ADAS control device, and the like, an appropriate temperature range (for example, 5° C. or higher and less than or equal to 60° C.) is defined for normally operating each of the components. Thereby, as shown in FIG. 15, the relationship between the state of the in-vehicle device 58 and the third low-temperature heat medium temperature TWL3 can be represented.

If the third low-temperature heat medium temperature TWL3 exceeds the upper limit of the appropriate temperature range (hereinafter referred to as the normal temperature range) related to the in-vehicle device 58, the in-vehicle device 58 may be damaged due to heat. In this case, the in-vehicle device 58 may not operate normally. In other words, when the third low-temperature heat medium temperature TWL3 exceeds the upper limit of the normal temperature range, it is necessary to emit heat from the low-temperature heat medium that has passed through the in-vehicle device 58, such that the heat of the in-vehicle device 58 is forcibly dissipated.

When the third low-temperature heat medium temperature TWL3 is lower than the lower limit of the normal temperature range of the in-vehicle device 58, it is considered that each component of the in-vehicle device 58 does not operate smoothly and does not exhibit sufficient functions. In other words, when the third low-temperature heat medium temperature TWL3 is below the lower limit of the normal temperature range, it is necessary to warm up the in-vehicle device 58 in order to operate the in-vehicle device 58 normally.

As shown in FIG. 14, in the vehicle air conditioner 1 according to the fifth embodiment, the low-temperature heat medium circuit 50 includes the cooling heat exchange unit 52 for adjusting the temperature of the battery 80, and the heat medium passage of the in-vehicle device 58. Therefore, in the fifth embodiment, it is necessary to achieve both the temperature adjustment of the battery 80 and the temperature adjustment of the in-vehicle device 58 by the circuit configuration of the low-temperature heat medium in the low-temperature heat medium circuit 50.

Therefore, the low-temperature heat medium circuit 50 according to the fifth embodiment has a first circulation mode and a second circulation mode as the circulation mode of the low-temperature heat medium. In the first circulation mode, the controller 60 operates the low-temperature heat medium pump 51 and the equipment heat medium pump 59 with the pumping capacity specified for each. Further, the controller 60 controls the operation of the three-way valve 53 and the equipment three-way valve 53a so as to switch two independent heat medium circulation paths in the low-temperature heat medium circuit 50.

As a result, in the first circulation mode, the low-temperature heat medium flows in order of the low-temperature heat medium pump 51, the cooling heat exchange unit 52, the three-way valve 53, the heat medium passage of the chiller 19, and the low-temperature heat medium pump 51. At the same time, the low-temperature heat medium flows in order of the equipment heat medium pump 59, the heat medium flow path of the in-vehicle device 58, the equipment three-way valve 53a, the low-temperature radiator 54, and the equipment heat medium pump 59.

Therefore, according to the first circulation mode, since the circulation path of the low-temperature heat medium flowing through the heat medium passage of the chiller 19 and the cooling heat exchange unit 52 is configured, heat can be absorbed from the battery 80 via the low-temperature heat medium cooled by the chiller 19. Further, in the first circulation mode, since the heat medium passage of the in-vehicle device 58 and the circulation path of the low-temperature heat medium flowing through the low-temperature radiator 54 are independently configured, the temperature of the in-vehicle device 58 and the temperature of the battery 80 can be adjusted independently. For example, by adjusting the amount of heat radiated from the low-temperature radiator 54, the waste heat of the in-vehicle device 58 can be stored in the low-temperature heat medium, in parallel with the cooling of the battery 80.

In the second circulation mode, the controller 60 operates the low-temperature heat medium pump 51 and the equipment heat medium pump 59 with the pumping capacity specified for each. Further, the controller 60 controls the operation of the three-way valve 53 and the equipment three-way valve 53a, to switch the heat medium circulation path connecting the cooling heat exchange unit 52 and the in-vehicle device 58 in parallel with respect to the flow of the low-temperature heat medium relative to the heat medium passage of the chiller 19.

As a result, in the second circulation mode, the low-temperature heat medium flows in order of the low-temperature heat medium pump 51, the cooling heat exchange unit 52, the three-way valve 53, the heat medium passage of the chiller 19, and the low-temperature heat medium pump 51. At the same time, the low-temperature heat medium flows in order of the equipment heat medium pump 59, the heat medium passage of the in-vehicle equipment 58, the equipment three-way valve 53a, the heat medium passage of the chiller 19, and the equipment heat medium pump 59.

Therefore, according to the second circulation mode, the low-temperature heat medium flowing through the heat medium passage of the chiller 19 can be circulated by flowing in parallel with the cooling heat exchange unit 52 and the in-vehicle device 58. Therefore, heat can be absorbed from the battery 80 and the in-vehicle device 58, using the refrigeration cycle device 10.

The refrigeration cycle device 10 according to the fifth embodiment can be operated in eleven types of operation modes (1) Air-cooling mode to (11) Cooler-unit mode, as in the above-described embodiments. In the fifth embodiment, the low-temperature heat medium circuit 50 can be switched to the first circulation mode or the second circulation mode in the operation mode in which the battery 80 is cooled. Thereby, the vehicle air conditioner 1 can switch the heat absorption mode between a heat absorption from the battery 80 and a heat absorption from the battery 80 and the in-vehicle device 58.

The operation modes for cooling the battery 80 include (5) Air-cooling cooler-unit mode, (6) Serial dehumidifying, heating and cooler-unit mode, (7) Parallel dehumidifying, heating and cooler-unit mode, (8) Heating cooler-unit mode, (9) Heating series cooler-unit mode, (10) Heating parallel cooler-unit mode, and (11) Cooler-unit mode.

In the operation mode for cooling the battery 80, when the battery temperature TB is between the upper limit temperature TBU and the lower limit temperature TBL and when the third low-temperature heat medium temperature TWL3 is within the normal temperature range, the low-temperature heat medium circuit 50 is switched to the first circulation mode or the second circulation mode. With this configuration, the vehicle air conditioner 1 according to the fifth embodiment can execute the cooling of the battery 80 using the refrigeration cycle 10a in preference to the cooling of the in-vehicle device 58. That is, the refrigeration cycle device 10 according to the fifth embodiment can perform temperature control in which the protection of the battery 80 is prioritized over the in-vehicle device 58.

Further, since the low-temperature radiator 54 is arranged in the low-temperature heat medium circuit 50 according to the fifth embodiment, it is possible to dissipate the heat of the low-temperature heat medium to the outside air. For example, when the second low-temperature heat medium temperature TWL2 is equal to or higher than the outside temperature Tam, the controller 60 controls the three-way valve 53 and the equipment three-way valve 53a such that the low-temperature heat medium flowing out of the cooling heat exchange unit 52 flows into the low-temperature radiator 54. When the second low-temperature heat medium temperature TWL2 is not equal to or higher than the outside temperature Tam, the controller 60 controls the operation of the three-way valve 53 such that the low-temperature heat medium flowing out from the cooling heat exchange unit 52 flows into the suction port of the low-temperature heat medium pump 51.

When the second low-temperature heat medium temperature TWL2 is equal to or higher than the outside air temperature Tam, the low-temperature heat medium flowing out from the cooling heat exchange unit 52 flows into the low-temperature radiator 54 and dissipates heat to the outside air. Thereby, the low-temperature heat medium is cooled until the temperature becomes equal to the outside air temperature Tam.

The other configurations and operations of the refrigeration cycle device 10 are similar to those of the first embodiment. According to this, advantages similar to that of the first embodiment can be obtained.

Sixth Embodiment

Figure 16:
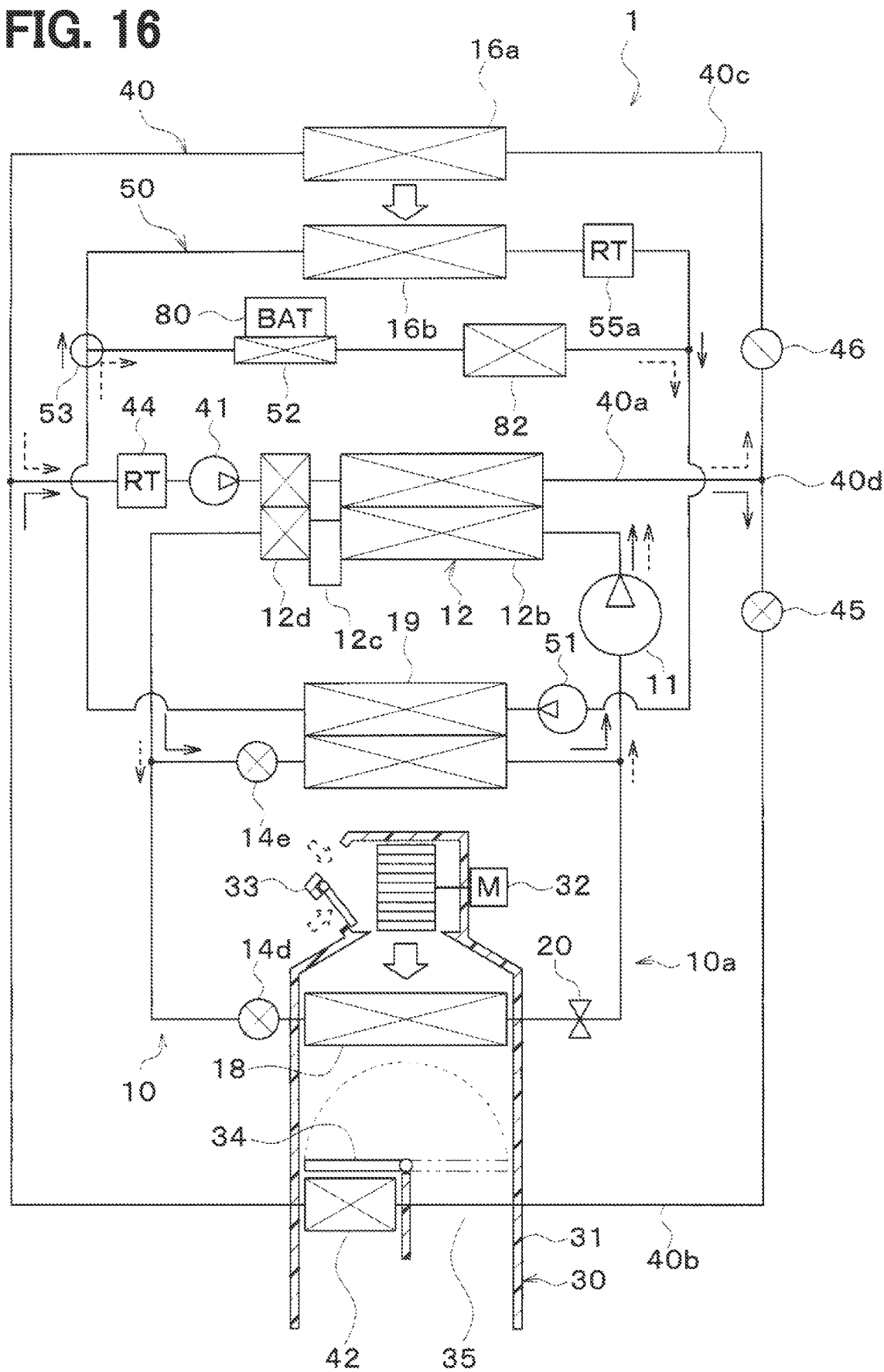
FIG. 16 is an overall configuration diagram of a vehicle air conditioner according to a sixth embodiment.

In this embodiment, as shown in FIG. 16, the configurations of the refrigeration cycle 10a, the high-temperature heat medium circuit 40, and the low-temperature heat medium circuit 50 in the first embodiment are changed. The refrigeration cycle device 10 according to the fifth embodiment is a vapor compression refrigerator including a compressor 11, a water refrigerant heat exchanger 12, a first expansion valve 14d, an indoor evaporator 18, an evaporation pressure adjusting valve 20, a second expansion valve 14e, and a chiller 19. The second expansion valve 14e and the chiller 19 are arranged in parallel with the first expansion valve 14d, the indoor evaporator 18, and the evaporation pressure adjusting valve 20 in the refrigerant flow.

A first refrigerant circulation circuit and a second refrigerant circulation circuit are formed in the refrigeration cycle device 10. In the first refrigerant circulation circuit, the refrigerant circulates in order of the compressor 11, the water refrigerant heat exchanger 12, the first expansion valve 14d, the indoor evaporator 18, the evaporation pressure adjusting valve 20, and the compressor 11. In the second refrigerant circulation circuit, the refrigerant circulates in order of the compressor 11, the water refrigerant heat exchanger 12, the second expansion valve 14e, and the chiller 19.

The compressor 11 is an electric compressor, and sucks in, compresses, and discharges the refrigerant of the refrigeration cycle device 10. The electric motor of the compressor 11 is controlled by the controller 60. The compressor 11 may be a variable displacement compressor driven by a belt.

The water refrigerant heat exchanger 12 is a high-pressure side heat exchanger that exchanges heat between the high-pressure side refrigerant discharged from the compressor 11 and the heat medium of the high-temperature heat medium circuit 40. The water refrigerant heat exchanger 12 has a condensing unit 12b, a receiver 12c, and a supercooling unit 12d.

The condensing unit 12b condenses the high-pressure refrigerant by exchanging heat between the high-pressure refrigerant discharged from the compressor 11 and the heat medium of the high-temperature heat medium circuit 40. The receiver 12c is a gas-liquid separation unit that separates the gas-liquid of the high-pressure refrigerant flowing out from the water refrigerant heat exchanger 12. The receiver 12c causes the separated liquid phase refrigerant to flow out to the downstream side, and stores the excess refrigerant in the cycle. The supercooling unit 12d supercools the liquid phase refrigerant by exchanging heat between the liquid phase refrigerant flowing out from the receiver 12c and the heat medium of the high-temperature heat medium circuit 40.

The first expansion valve 14d is a first decompression unit that decompresses and expands the liquid phase refrigerant flowing out of the receiver 12c. The first expansion valve 14d is a mechanical temperature expansion valve. The mechanical expansion valve is a temperature expansion valve having a temperature sensitive part and driving a valve element by using a mechanical mechanism such as a diaphragm.

The indoor evaporator 18 evaporates the refrigerant by exchanging heat between the refrigerant flowing out from the first expansion valve 14d and the air blown into the vehicle interior. In the indoor evaporator 18, the refrigerant absorbs heat from the air blown into the vehicle interior.

The evaporation pressure adjusting valve 20 is a pressure adjusting unit that maintains the pressure of the refrigerant on the outlet side of the indoor evaporator 18 at a predetermined value. The evaporation pressure adjusting valve 20 is composed of a mechanical variable throttle mechanism. Specifically, the evaporation pressure adjusting valve 20 reduces the passage area (that is, the throttle opening) of the refrigerant passage when the pressure of the refrigerant on the outlet side of the indoor evaporator 18 falls below a predetermined value. When the pressure of the refrigerant on the outlet side of the indoor evaporator 18 exceeds a predetermined value, the evaporation pressure adjusting valve 20 increases the passage area (that is, the throttle opening) of the refrigerant passage. The vapor phase refrigerant adjusted in pressure by the evaporation pressure adjusting valve 20 is sucked into the compressor 11 and compressed.

The second expansion valve 14e is a second decompression unit that decompresses and expands the liquid phase refrigerant flowing out of the water refrigerant heat exchanger 12, and is composed of an electric expansion valve. The second expansion valve 14e can completely close the refrigerant passage. The second expansion valve 14e is a refrigerant flow switching unit that switches between a state in which the refrigerant flows through the indoor evaporator 18 and a state in which the refrigerant flows through both the indoor evaporator 18 and the chiller 19. The operation of the second expansion valve 14e is controlled by a control signal output from the controller 60.

The second expansion valve 14e may be a mechanical temperature expansion valve. When the second expansion valve 14e is a mechanical temperature expansion valve, an on-off valve for opening and closing the refrigerant passage for the second expansion valve 14e needs to be provided separately from the second expansion valve 14e.

The chiller 19 is an evaporator that evaporates the refrigerant by exchanging heat between the refrigerant flowing out from the second expansion valve 14e and the low-temperature heat medium of the low-temperature heat medium circuit 50. In the chiller 19, the refrigerant absorbs heat from the low-temperature heat medium of the low-temperature heat medium circuit 50. The vapor phase refrigerant evaporated in the chiller 19 is sucked into the compressor 11 and compressed.

The high-temperature heat medium circuit 40 according to the sixth embodiment includes a water refrigerant heat exchanger 12, a high-temperature heat medium pump 41, a heater core 42, a first outdoor heat exchanger 16a, a high-temperature reserve tank 44, a heating side on-off valve 45 and a heat dissipation side on-off valve 46.

The high-temperature heat medium pump 41 is an electric heat medium pump that sucks in and discharges the heat medium. The heater core 42 is an air heater that heats the air blown into the vehicle interior by exchanging heat between the high-temperature heat medium of the high-temperature heat medium circuit 40 and the air blown into the vehicle interior. In the heater core 42, the high-temperature side heat medium emits heat to the air blown into the vehicle interior.

The first outdoor heat exchanger 16a is an outdoor heat exchanger that exchanges heat between the heat medium of the high-temperature heat medium circuit 40 and the outside air, and corresponds to an outdoor heat exchanger. When the temperature of the high-temperature heat medium is higher than the outside air temperature, the first outdoor heat exchanger 16a functions as a radiator that dissipates heat from the high-temperature heat medium to the outside air.

The high-temperature reserve tank 44 is a heat medium storage unit for storing a surplus high-temperature heat medium. By storing the excess high-temperature heat medium in the high-temperature reserve tank 44, it is possible to suppress a decrease in the amount of the liquid heat medium circulating in each flow path.

The high-temperature reserve tank 44 is a closed type reserve tank or an open-air reserve tank. The closed reserve tank is a reserve tank in which the pressure at the liquid level of the stored heat medium is set to a predetermined pressure. The open-air reserve tank is a reserve tank that makes the pressure at the liquid surface of the stored heat medium atmospheric pressure.

In the high-temperature heat medium circuit 40 according to the fifth embodiment, the water refrigerant heat exchanger 12, the high-temperature heat medium pump 41, and the high-temperature reserve tank 44 are arranged in the condenser flow path 40a. A heating flow path 40b and a heat dissipation flow path 40c are connected to both ends of the condenser flow path 40a. The condenser flow path 40a is a flow path in which the high-temperature heat medium flowing through the heating flow path 40b and the high-temperature heat medium flowing through the heat dissipation flow path 40c flow in common.

As shown in FIG. 16, a heater core 42 and a heating side on-off valve 45 are arranged in the heating flow path 40b. The high-temperature heat medium flows in the heating flow path 40b to heat the air blown into the vehicle interior.

The heating side on-off valve 45 is a solenoid valve that opens and closes the heating flow path 40b, and is located between the heater core 42 and the high-temperature branch portion 40d, which is a branch portion between the heating flow path 40b and the heat dissipation flow path 40c. The heating side on-off valve 45 adjusts the flow rate of the heat medium of the high-temperature heat medium circuit 40 flowing into the heater core 42. The operation of the heating side on-off valve 45 is controlled by the controller 60.

A first outdoor heat exchanger 16a and a heat dissipation side on-off valve 46 are arranged in the heat dissipation flow path 40c. The high-temperature heat medium flows in the heat dissipation flow path 40c in parallel with the heater core 42 in the high-temperature heat medium circuit 40, for dissipating the heat of the high-temperature heat medium to the outside air. The heat dissipation side on-off valve 46 is a solenoid valve that opens and closes the heat dissipation flow path 40c. The operation of the heat dissipation side on-off valve 46 is controlled by the controller 60.

The heat dissipation side on-off valve 46 is arranged between the high-temperature branch portion 40d formed at the end of the condenser flow path 40a and the first outdoor heat exchanger 16a. The heat dissipation side on-off valve 46 is arranged between the high-temperature branch portion 40d and the first outdoor heat exchanger 16a in the high-temperature heat medium circuit 40, and controls the flow rate of the high-temperature heat medium flowing into the first outdoor heat exchanger 16a. The heating side on-off valve 45 and the heat dissipation side on-off valve 46 adjust the flow rate ratio between the high-temperature heat medium flowing through the heater core 42 and the high-temperature heat medium flowing through the first outdoor heat exchanger 16a.

As shown in FIG. 16, the low-temperature heat medium circuit 50 according to the sixth embodiment includes a low-temperature heat medium pump 51, a chiller 19, a second outdoor heat exchanger 16b, a battery 80, a charger 82, and a low-temperature reserve tank 55a.

The low-temperature heat medium pump 51 is an electric heat medium pump that sucks in and discharges the low-temperature heat medium. The second outdoor heat exchanger 16b is an outdoor heat exchanger that exchanges heat between the low-temperature heat medium of the low-temperature heat medium circuit 50 and the outside air, and corresponds to an outdoor heat exchanger. When the temperature of the low-temperature heat medium is lower than the outside air temperature, the second outdoor heat exchanger 16b functions as a heat absorber that absorbs heat from the outside air to the low-temperature heat medium.

The first outdoor heat exchanger 16a and the second outdoor heat exchanger 16b are arranged in series in this order in the flow direction of the outside air. Outside air is blown to the first outdoor heat exchanger 16a and the second outdoor heat exchanger 16b by an outside air fan (not shown). The outside air fan blows outside air toward the first outdoor heat exchanger 16a and the second outdoor heat exchanger 16b, and is composed of an electric blower that drives the fan with an electric motor. The operation of the outside air fan is controlled by the controller 60.

The first outdoor heat exchanger 16a, the second outdoor heat exchanger 16b, and the outside air fan are arranged at the most front part of the vehicle. Therefore, when the vehicle is traveling, the wind can be applied to the first outdoor heat exchanger 16a and the second outdoor heat exchanger 16b.

The low-temperature reserve tank 55a is arranged on the outlet side of the second outdoor heat exchanger 16b. The low-temperature reserve tank 55a is a heat medium storage unit for storing excess low-temperature heat medium. By storing the surplus heat medium in the low-temperature reserve tank 55a, it is possible to suppress a decrease in the amount of the low-temperature heat medium circulating in each flow path. As the low-temperature reserve tank 55a, a closed type reserve tank or an open-air reserve tank can be adopted as in the case of the high-temperature reserve tank 44.

In the low-temperature heat medium circuit 50, a three-way valve 53 is arranged between the outlet side of the heat medium passage in the chiller 19 and the inlet side of the second outdoor heat exchanger 16b. The outlet side of the heat medium passage of the chiller 19 is connected to the inflow port of the three-way valve 53 according to the sixth embodiment. The inlet side of the second outdoor heat exchanger 16b is connected to one outlet of the three-way valve 53. The inlet side of the cooling heat exchange unit 52 is connected to the other outlet of the three-way valve 53.

Therefore, the three-way valve 53 is a flow rate adjusting unit that adjusts the flow rate ratio between the flow rate of the low-temperature heat medium flowing toward the cooling heat exchange unit 52 and the flow rate of the low-temperature heat medium flowing toward the second outdoor heat exchanger 16b. Further, the three-way valve 53 can select the outflow destination, e.g., any one of the two outflow ports, of the low-temperature heat medium flowing in from one inflow port. That is, the three-way valve 53 functions as a switching unit for switching between a state in which the heat medium flows in the second outdoor heat exchanger 16b and a state in which the heat medium does not flow in the second outdoor heat exchanger 16b. The operation of the three-way valve 53 is controlled by the controller 60.

The cooling heat exchange unit 52 according to the sixth embodiment has the same configuration as that of the above-described embodiment. Heat is exchanged between the low-temperature heat medium flowing through the heat medium passage and the battery 80 to cool the battery 80. The charger 82 is connected to the outlet side of the heat medium passage of the cooling heat exchange unit 52. The charger 82 is configured to charge the battery 80 with electric power. The battery 80 and the charger 82 dissipate the waste heat generated by the operation to the heat medium of the low-temperature heat medium circuit 50. In other words, the battery 80 and the charger 82 supply heat to the heat medium of the low-temperature heat medium circuit 50.

Next, the operation in the above configuration will be described. When the air conditioner switch of the operation panel 70 is turned on by the occupant, the controller 60 switches the operation mode in accordance with the suction air temperature TEin of the indoor evaporator 18 and the target blowout temperature TAO based on the control map.

The operation mode of the refrigeration cycle device 10 according to the sixth embodiment is a combination of an air conditioning mode for the vehicle interior and a cooling mode for temperature adjustment of the battery 80, as in the first embodiment. Specifically, in the refrigeration cycle device 10 according to the present embodiment, the refrigerant circuit can be switched to perform operation in the following seven operation modes.

(A) Air-cooling mode: an operation mode in which the inside of the vehicle is cooled by cooling the air without cooling the battery 80 or the like.
(B) Dehumidifying heating mode: an operation mode in which the inside of the vehicle is dehumidified and heated by reheating the cooled and dehumidified air without cooling the battery 80 or the like.
(C) Heating mode: an operation mode in which the interior of the vehicle is heated by heating the air without cooling the battery 80 or the like.
(D) Air-cooling cooler-unit mode: an operation mode in which the battery 80 is cooled, and the air is cooled and blown into the vehicle interior to cool the vehicle interior.
(E) Dehumidifying heating cooler-unit mode: an operation mode in which the battery 80 is cooled, and the cooled and dehumidified air is reheated and blown into the vehicle interior.
(F) Heating cooler-unit mode: an operation mode in which the battery 80 is cooled and the air is heated and blown into the vehicle interior to heat the vehicle interior.
(G) Cooler-unit mode: an operation mode in which the battery 80 is cooled without conditioning air for the cabin.

In the sixth embodiment, when determining the operation mode from the seven modes, either the first reference cooling temperature KTB1 or the second reference cooling temperature KTB2 is used as the reference cooling temperature KTB as a criterion for cooling the battery 80. Specifically, it is determined whether the case where the first outdoor heat exchanger 16a functions as a radiator and the case where the second outdoor heat exchanger 16b functions as a heat absorber based on the air conditioning operation mode or the like, and sets either the first reference cooling temperature KTB1 or the second reference cooling temperature KTB2.

Specifically, when the air conditioning mode is the air-cooling mode, the refrigerant flows in order of the compressor 11, the water refrigerant heat exchanger 12, the first expansion valve 14d, the indoor evaporator 18, the evaporation pressure adjusting valve 20 and the compressor 11 in the refrigeration cycle device 10.

In the high-temperature heat medium circuit 40, the high-temperature heat medium flows in order of the high-temperature heat medium pump 41, the water refrigerant heat exchanger 12, the heat dissipation side on-off valve 46, the first outdoor heat exchanger 16a, the high-temperature reserve tank 44 and the high-temperature heat medium pump 41.

Therefore, in the air-cooling mode, the heat absorbed from the blown air is pumped up by the refrigeration cycle 10a and transferred to the outside air by the first outdoor heat exchanger 16a via the high-temperature heat medium. In this way, when heat is dissipated to the outside air by the first outdoor heat exchanger 16a, the controller 60 sets the first reference cooling temperature KTB1 as the reference cooling temperature KTB. When the temperature of the air supplied to the vehicle interior is low as in the air-cooling mode, the first reference cooling temperature KTB1 is set as the reference cooling temperature KTB.

Next, when the air conditioning mode is the heating mode, in the refrigeration cycle device 10, the refrigerant flows in order of the compressor 11, the water refrigerant heat exchanger 12, the second expansion valve 14e, the chiller 19, and the compressor 11.

Further, in the high-temperature heat medium circuit 40, the high-temperature heat medium flows in order of the high-temperature heat medium pump 41, the water refrigerant heat exchanger 12, the heating side on-off valve 45, the heater core 42, the high-temperature reserve tank 44, and the high-temperature heat medium pump 41. In the low-temperature heat medium circuit 50, the low-temperature heat medium flows in order of the low-temperature heat medium pump 51, the chiller 19, the three-way valve 53, the second outdoor heat exchanger 16b, the low-temperature reserve tank 55a, and the low-temperature heat medium pump 51.

As a result, in the heating mode, the heat absorbed from the outside air by the second outdoor heat exchanger 16b is pumped up by the refrigeration cycle 10a and used as a heating heat source for heating the blown air by the heater core 42. Since heat is absorbed from the outside air by the second outdoor heat exchanger 16b, the controller 60 sets the second reference cooling temperature KTB2 as the reference cooling temperature KTB. When the temperature of the air supplied to the vehicle interior is high as in the heating mode, the second reference cooling temperature KTB2 is set as the reference cooling temperature KTB.

The other configurations and operations of the refrigeration cycle device 10 are similar to those of the first embodiment. According to this, advantages similar to that of the first embodiment can be obtained. That is, also in the refrigeration cycle device 10 of the present embodiment, the temperature of the air can be continuously adjusted within a wide range while appropriately adjusting the temperature of the battery 80.

The present disclosure is not limited to the above-described embodiments, and can be variously modified as follows without departing from the gist of the present disclosure.

Although the refrigeration cycle device 10 is capable of switching the operation modes, the configuration of the refrigeration cycle device 10 is not limited to the above-described embodiment. That is, the refrigeration cycle device 10 may be modified while having the compressor 11, the heating unit, the outdoor heat exchanger 16, and the cooler unit, and capable of switching the circuit configurations in which the outdoor heat exchanger 16 functions as a radiator or a heat absorber.

The switching of the operation mode in the refrigeration cycle device 10 is not limited to the above-described embodiment. Each reference temperature for determining the air conditioning mode can also be changed as appropriate. For example, in the above embodiment, the high-temperature cooling reference temperature $\beta 2$ is determined to be higher than the dehumidifying reference temperature $\beta 1$, but the high-temperature cooling reference temperature $\beta 2$ and the dehumidifying reference temperature $\beta 1$ may be equivalent. Further, the low-temperature cooling reference temperature $\alpha 2$ is determined to be higher than the cooling reference temperature $\alpha 1$, the low-temperature cooling reference temperature $\alpha 2$ and the cooling reference temperature $\alpha 1$ may be equivalent.

Further, the detailed control of each operation mode is not limited to that disclosed in the above-described embodiment. For example, the ventilation mode described in step S270 may be a stop mode in which the blower 32 is stopped in addition to the compressor 11.

The components of the refrigeration cycle device are not limited to those disclosed in the above-described embodiment. The components of the cycle may be integrated to perform the above-described effects. For example, a four-way joint structure in which the second three-way joint 13b and the fifth three-way joint 13e are integrated may be adopted. Further, the air-cooling expansion valve 14b and the cooler-unit expansion valve 14c may be defined by directly connecting an electric expansion valve having no fully closing function and an on-off valve.

In the embodiments, although R1234yf is employed as the refrigerant, the refrigerant is not limited. For example, R134a, R600a, R410A, R404A, R32, R407C, and the like may be employed. Alternatively, a mixed refrigerant or the like in which multiple types of those refrigerants are mixed together may be employed. Further, carbon dioxide may be employed as the refrigerant to configure a supercritical refrigeration cycle in which a high-pressure side refrigerant pressure is equal to or higher than the critical pressure of the refrigerant.

The configuration of the heating unit is not limited to that disclosed in the above-described embodiment. For example, a three-way valve and a high-temperature radiator similar to the three-way valve 53 and the low-temperature radiator 54 of the low-temperature heat medium circuit 50 according to the fifth embodiment may be added to the high-temperature heat medium circuit 40 described in the first embodiment, and excess heat may be dissipated to the outside air. Further, in a vehicle including an internal combustion engine (engine) such as a hybrid vehicle, an engine cooling water may be circulated in the high-temperature heat medium circuit 40. Further, the indoor condenser 12a described in the fourth embodiment may be adopted as the heating unit instead of the heating unit including the water refrigerant heat exchanger 12 and the high-temperature heat medium circuit 40.

In each of the embodiments, the refrigeration cycle device 10 according to the present disclosure is applied to the vehicle air conditioner 1, but the application of the refrigeration cycle device 10 is not limited to this. For example, it may be applied to an air conditioner with a server cooling function for appropriately adjusting a temperature of a computer server while conditioning air for a room.

The present disclosure should not be limited to the examples and structures described in accordance with the embodiments. The present disclosure encompasses various modifications and variations within the scope of equivalents. In addition, as the various combinations and configurations, which are preferred, other combinations and configurations, including more, less or only a single element, are also within the spirit and scope of the present disclosure.

What is claimed is:

1. A refrigeration cycle device for an air conditioner comprising:
    a refrigeration cycle including a compressor that compresses and discharges a refrigerant, a heating unit that heats air blown to an air-conditioned space using the refrigerant discharged from the compressor as a heat source, and a cooler unit that evaporates the refrigerant to cool a battery;
    an outdoor heat exchanger configured to exchange heat between the refrigerant or a heat medium that exchanges heat with the refrigerant and an outside air;
    a cooling necessity determination unit configured to determine whether or not to cool the battery based on whether or not a physical quantity having a correlation with a temperature of the battery is equal to or more than a predetermined reference physical quantity;
    a determination reference setting unit configured to set the reference physical quantity for the cooling necessity determination unit depending on the outdoor heat exchanger functioning as heat absorber or radiator; and
    a cooling control unit configured to cool of the battery using the cooler unit when the cooling necessity determination unit determines that the battery is to be cooled, wherein
    the determination reference setting unit sets a second reference physical quantity when the outdoor heat exchanger functions as heat absorber, the second reference physical quantity being smaller than a first reference physical quantity which is set when the outdoor heat exchanger functions as radiator.

2. The refrigeration cycle device according to claim 1, further comprising:
    a circuit switching unit configured to switch a refrigerant circuit of the refrigeration cycle for the outdoor heat exchanger to function as radiator or heat absorber, wherein
    the determination reference setting unit sets the first reference physical quantity when the circuit switching unit switches the refrigerant circuit of the refrigeration cycle for the outdoor heat exchanger to function as radiator, and
    the determination reference setting unit sets the second reference physical quantity when the circuit switching unit switches the refrigerant circuit of the refrigeration cycle for the outdoor heat exchanger to function as heat absorber.

3. The refrigeration cycle device according to claim 1, wherein
    the heating unit has a first outdoor heat exchanger configured to exchange heat between a heat medium heated by heat of refrigerant discharged from the compressor and the outside air, as the outdoor heat exchanger,
    the cooler unit has a second outdoor heat exchanger configured to exchange heat between a heat medium cooled by evaporation of the refrigerant and the outside air, as the outdoor heat exchanger,
    the determination reference setting unit sets the first reference physical quantity when the first outdoor heat exchanger functions as radiator, and
    the determination reference setting unit sets the second reference physical quantity when the second outdoor heat exchanger functions as heat absorber.

4. The refrigeration cycle device according to claim 1, wherein
    the second reference physical quantity is set to satisfy both a condition based on input/output characteristics of the battery with respect to the temperature of the battery and a condition based on deterioration tendency of the battery with respect to the temperature of the battery.

5. The refrigeration cycle device according to claim 4, wherein the second reference physical quantity has a correlation with a temperature higher than a lower limit temperature of a temperature range of the battery determined by an input/output condition of the battery, and is lower than the first reference physical quantity.

6. The refrigeration cycle device according to claim 1, wherein the first reference physical quantity is determined according to a condition based on input/output characteristics of the battery with respect to the temperature of the battery.

7. The refrigeration cycle device according to claim 6, wherein the first reference physical quantity has a correlation with a temperature lower than an upper limit temperature of a temperature range of the battery determined by an input/output condition of the battery, and is higher than the second reference physical quantity.

\* \* \* \* \*